United States Patent
Khoshnevisan et al.

(10) Patent No.: US 12,323,344 B2
(45) Date of Patent: Jun. 3, 2025

(54) UPLINK REPORTING TECHNIQUES FOR MULTI TRANSMISSION-RECEPTION POINT TRANSMISSIONS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US); Makesh Pravin John Wilson, San Diego, CA (US)

(*) Notice: Subject to any disclaimer, the term of this patent is extended or adjusted under 35 U.S.C. 154(b) by 29 days.

(21) Appl. No.: 16/705,093

(22) Filed: Dec. 5, 2019

(65) Prior Publication Data

US 2020/0186304 A1    Jun. 11, 2020

Related U.S. Application Data

(60) Provisional application No. 62/777,058, filed on Dec. 7, 2018.

(51) Int. Cl.
*H04W 76/15* (2018.01)
*H04L 5/00* (2006.01)
(Continued)

(52) U.S. Cl.
CPC ......... *H04L 5/0032* (2013.01); *H04W 52/365* (2013.01); *H04W 52/40* (2013.01);
(Continued)

(58) Field of Classification Search
None
See application file for complete search history.

(56) References Cited

U.S. PATENT DOCUMENTS

| 9,264,930 B2 | 2/2016 | Damnjanovic et al. |
| 2010/0272091 A1 | 10/2010 | Fabien et al. |

(Continued)

FOREIGN PATENT DOCUMENTS

| CN | 108781465 A | | 11/2018 |
| KR | 20150018285 A | * | 2/2015 |

(Continued)

OTHER PUBLICATIONS

Partial International Search Report—PCT/US2019/065061—ISA/EPO—Apr. 23, 2020 (190616WO).

(Continued)

*Primary Examiner* — The Hy Nguyen

(57) ABSTRACT

Methods, systems, and devices for wireless communications are described that support uplink reporting techniques for multi transmission-reception point (TRP) transmissions. Various reporting configurations may be provided that allow for user equipment (UE) communications via multiple concurrent wireless connections with multiple TRPs. A UE may identify a reporting configuration and transmit a report (e.g., a buffer status report (BSR) or a power headroom report (PHR)) to one or more of the TRPs based on the identified reporting configuration. The multiple TRPs may have non-ideal backhaul connections and the reporting configuration may allow the UE to transmit separate reports to different TRPs. The different TRPs may then use the separate reports for corresponding communications with the UE. In cases where shared radio frequency spectrum is used for communications, a single channel access priority class (CAPC) for multiple TRPs may be determined for a contention-based channel access procedure.

23 Claims, 22 Drawing Sheets

(51) Int. Cl.
*H04W 52/36* (2009.01)
*H04W 52/40* (2009.01)
*H04W 72/21* (2023.01)
*H04W 72/29* (2023.01)

(52) U.S. Cl.
CPC .......... *H04W 72/21* (2023.01); *H04W 72/29* (2023.01); *H04W 76/15* (2018.02)

(56) References Cited

U.S. PATENT DOCUMENTS

| | | | | |
|---|---|---|---|---|
| 2013/0176953 | A1* | 7/2013 | Stern-Berkowitz | H04W 52/365 370/329 |
| 2013/0188570 | A1* | 7/2013 | Zhao | H04L 5/001 370/329 |
| 2014/0269352 | A1* | 9/2014 | Sun | H04W 76/27 370/250 |
| 2014/0323037 | A1* | 10/2014 | Murakami | H04W 52/38 455/7 |
| 2014/0329551 | A1* | 11/2014 | Ryoo | H04W 52/34 455/522 |
| 2015/0003345 | A1* | 1/2015 | Kuo | G06Q 20/387 370/329 |
| 2015/0087296 | A1* | 3/2015 | Kim | H04W 52/04 455/422.1 |
| 2015/0098322 | A1* | 4/2015 | Chen | H04W 28/0252 370/230 |
| 2015/0271811 | A1* | 9/2015 | Kim | H04W 52/34 370/329 |
| 2015/0312957 | A1 | 10/2015 | Pelletier et al. | |
| 2015/0327116 | A1* | 11/2015 | Zhang | H04W 72/1284 370/329 |
| 2015/0334737 | A1* | 11/2015 | Susitaival | H04W 24/02 370/329 |
| 2016/0066284 | A1* | 3/2016 | Kwon | H04W 72/0413 370/329 |
| 2016/0174210 | A1* | 6/2016 | Lee | H04W 24/10 370/329 |
| 2016/0205604 | A1* | 7/2016 | Kang | H04W 36/0072 370/331 |
| 2018/0132197 | A1* | 5/2018 | Lin | H04W 52/242 |
| 2018/0146440 | A1 | 5/2018 | Hosseini et al. | |
| 2018/0279339 | A1* | 9/2018 | Löhr | H04W 52/365 |
| 2018/0324715 | A1* | 11/2018 | Ryoo | H04L 5/0007 |
| 2018/0324872 | A1* | 11/2018 | Babaei | H04W 72/042 |
| 2018/0332498 | A1 | 11/2018 | Zhou et al. | |
| 2019/0281562 | A1* | 9/2019 | Li | H04W 52/365 |
| 2020/0022094 | A1* | 1/2020 | You | H04W 72/0413 |

FOREIGN PATENT DOCUMENTS

| | | | |
|---|---|---|---|
| WO | WO-2012000177 A1 * | 1/2012 | ........ H04W 72/1284 |
| WO | WO-2014074656 | 5/2014 | |

OTHER PUBLICATIONS

International Search Report and Written Opinion—PCT/US2019/065061—ISAEPO—Jul. 7, 2020 (190616WO).

Mediatek Inc: "LBT and CAPC for Uplink Control Channels in NR-U", 3GPP Draft, 3GPP TSG-RAN2#103-BIS Meeting, R2-1813679_LBT and CAPC for PUCCH in NR-U, 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 13, 2018, Sep. 27, 2018 (Sep. 27, 2018), XP051523174, 3 Pages, Retrieved from the Internet: URL: http://www.3gpp.org/ftp/tsg%5Fran/WG2%5FRL2/TSGR2%5F103bis/Docs/R2%2D1813679%2Ezip, [retrieved on Sep. 27, 2018], 2 Uplink Control Channels.

OPPO: "SR Transmission and Procedure for NR-U", 3GPP Draft, 3GPP TSG-RAN WG2 Meeting #103bis, R2-1813585—SR Transmission and Procedure for NR-U, 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 12, 2018, Sep. 27, 2018 (Sep. 27, 2018), XP051523086, 3 Pages, Retrieved from the Internet: URL: http://www.3gpp.org/ftp/tsg%5Fran/WG2%5FRL2/TSGR2%5F103bis/Docs/R2%2D1813585%2Ezip, [retrieved on Sep. 27, 2018], p. 2, Observation 2.

* cited by examiner

UPLINK REPORTING TECHNIQUES FOR MULTI TRANSMISSION-RECEPTION POINT TRANSMISSIONS

CROSS REFERENCE

The present Application for Patent claims the benefit of U.S. Provisional Patent Application No. 62/777,058 by KHOSHNEVISAN et al., entitled "UPLINK REPORTING TECHNIQUES FOR MULTI TRANSMISSION-RECEPTION POINT TRANSMISSIONS," filed Dec. 7, 2018, assigned to the assignee hereof, and expressly incorporated herein.

BACKGROUND

The following relates generally to wireless communications, and more specifically to uplink reporting techniques for multi transmission-reception point transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may establish wireless connections with two or more TRPs, which may enhance capacity and reliability for communications with the UE. In some cases, the two or more TRPs may communicate with each other via a backhaul connection (e.g., via an X2, Xn, or other interface in an LTE or NR system) and may coordinate to schedule resource allocations to the UE and share reporting information from the UE. However, in some cases, the backhaul connection between TRPs may be non-ideal and support only limited communications between TRPs (e.g., due to capacity constraints or low data rates of the backhaul connection). Efficient techniques for communications between a UE and multiple TRPs that can accommodate ideal and non-ideal backhaul connections may be desirable to provide enhanced capacity and reliability in a wireless communications system.

SUMMARY

The described techniques relate to improved methods, systems, devices, and apparatuses that support uplink reporting techniques for multi transmission-reception point (TRP) transmissions. In various aspects, the described techniques provide reporting configurations that allow for user equipment (UE) communications via multiple concurrent wireless connections with multiple TRPs. A UE may identify a reporting configuration and transmit a report (e.g., a buffer status report (BSR), power headroom report (PHR), or combinations thereof) to one or more of the TRPs based on the identified reporting configuration. In some cases, the multiple TRPs may have non-ideal backhaul connections (e.g., backhaul links having a latency that exceeds a threshold value for coordinated TRP scheduling), and the reporting configuration may allow the UE to transmit separate reports to different TRPs. The different TRPs may then use the separate reports for corresponding communications with the UE. In some cases, the multiple TRPs may have ideal backhaul connections, and the UE may use a reporting configuration in which a single report from the UE to one TRP may be shared with other TRPs.

In some cases, the UE and TRPs may use shared radio frequency spectrum for communications, and may access the shared radio frequency spectrum using contention-based channel access techniques. In some cases, a UE may use a channel access priority class (CAPC) to determine one or more parameters for contention-based channel access, such as parameters for a listen-before-talk (LBT) procedure. In cases where the UE is to transmit concurrently to multiple TRPs, a single CAPC may be determined for an LBT procedure. In some cases, the single CAPC may be determined based on one or more logical channel transmissions or medium access control (MAC) control element (CE) transmissions within a transmission opportunity (TxOP) associated with the LBT procedure. For example, if a MAC CE is to be transmitted (with the exception of a padding BSR) a highest CAPC may be selected for the LBT procedure, and otherwise a lowest CAPC of the logical channel transmissions may be selected for the LBT procedure. In some cases, CAPC may be determined independently for separate LBT procedures for different TRPs.

A method of wireless communication at a UE is described. The method may include establishing wireless connections with a set of TRPs, identifying a first reporting configuration of a set of reporting configurations for the UE to use to transmit reporting information for one or more of a BSR or a PHR to the set of TRPs, determining, based on the first reporting configuration, one or more TRPs of the set of TRPs to which to transmit the reporting information, and transmitting the reporting information to the determined one or more TRPs according to the identified first reporting configuration.

An apparatus for wireless communication at a UE is described. The apparatus may include a processor, memory in electronic communication with the processor, and instructions stored in the memory. The instructions may be executable by the processor to cause the apparatus to establish wireless connections with a set of TRPs, identify a first reporting configuration of a set of reporting configurations for the UE to use to transmit reporting information for one or more of a BSR or a PHR to the set of TRPs, determine, based on the first reporting configuration, one or more TRPs of the set of TRPs to which to transmit the reporting information, and transmit the reporting information to the determined one or more TRPs according to the identified first reporting configuration.

Another apparatus for wireless communication at a UE is described. The apparatus may include means for establishing wireless connections with a set of TRPs, identifying a first reporting configuration of a set of reporting configurations for the UE to use to transmit reporting information for one or more of a BSR or a PHR to the set of TRPs, determining, based on the first reporting configuration, one or more TRPs of the set of TRPs to which to transmit the reporting information, and transmitting the reporting information to the determined one or more TRPs according to the identified first reporting configuration.

A non-transitory computer-readable medium storing code for wireless communication at a UE is described. The code may include instructions executable by a processor to establish wireless connections with a set of TRPs, identify a first reporting configuration of a set of reporting configurations for the UE to use to transmit reporting information for one or more of a BSR or a PHR to the set of TRPs, determine, based on the first reporting configuration, one or more TRPs of the set of TRPs to which to transmit the reporting information, and transmit the reporting information to the determined one or more TRPs according to the identified first reporting configuration.

In some examples of the method, apparatuses, and non-transitory computer-readable medium described herein, the reporting information includes a buffer status report (BSR). In some examples of the method, apparatuses, and non-transitory computer-readable medium described herein, the BSR may be a single BSR that is transmitted to a first TRP of the set of TRPs for use by two or more TRPs of the set of TRPs in scheduling uplink transmissions of the UE. Some examples of the method, apparatuses, and non-transitory computer-readable medium described herein may further include operations, features, means, or instructions for receiving an uplink grant from a first TRP of the set of TRPs, and where the determining includes determining, based on the first reporting configuration and the uplink grant being received from the first TRP, to transmit the BSR to the first TRP.

Some examples of the method, apparatuses, and non-transitory computer-readable medium described herein may further include operations, features, means, or instructions for receiving a first uplink grant for a first uplink transmission to a first TRP of the set of TRPs and a second uplink grant for a second uplink transmission to a second TRP of the set of TRPs, the first uplink transmission concurrent at least in part with the second uplink transmission, and where the determining includes selecting, based on the first reporting configuration, the first TRP or the second TRP to receive the BSR. In some examples of the method, apparatuses, and non-transitory computer-readable medium described herein, the first TRP or the second TRP may be selected to receive the BSR based on an amount of uplink resources allocated in each uplink grant, or channel conditions between the UE and the first TRP, or channel conditions between the UE and the second TRP, or a modulation and coding scheme (MCS) of each uplink grant, or a combination thereof.

In some examples of the method, apparatuses, and non-transitory computer-readable medium described herein, the BSR may be a first BSR transmitted to a first TRP of the set of TRPs, and where the method, apparatuses, and non-transitory computer-readable medium may further may include operations, features, means, or instructions for determining to transmit a second BSR to a second TRP of the set of TRPs according to a second reporting configuration of the set of reporting configurations, and transmitting the second BSR to the second TRP according to the second reporting configuration. In some examples of the method, apparatuses, and non-transitory computer-readable medium described herein, the set of reporting configurations include separate BSR configurations provided for each of the first TRP and the second TRP that is to be used by the UE for transmission of the corresponding BSR to the corresponding TRP. In some examples of the method, apparatuses, and non-transitory computer-readable medium described herein, the first BSR may be transmitted to the first TRP based on a first trigger from the first configuration, and the second BSR may be transmitted to the second TRP based on a second trigger from the second configuration.

In some examples of the method, apparatuses, and non-transitory computer-readable medium described herein, a buffer status reported in each of the first BSR and the second BSR may be a current buffer status of the UE irrespective of uplink data transmissions to one or more other TRPs of the set of TRPs. Some examples of the method, apparatuses, and non-transitory computer-readable medium described herein may further include operations, features, means, or instructions for determining a current buffer status of the UE, identifying a ratio of data transmitted to a first TRP of the set of TRPs relative to a total amount of data transmitted to each of the set of TRPs, adjusting the current buffer status of the UE based on the identified ratio to obtain a first adjusted buffer status, and reporting the first adjusted buffer status to the first TRP. In some examples of the method, apparatuses, and non-transitory computer-readable medium described herein, the identifying the ratio may include operations, features, means, or instructions for estimating the ratio based on past amounts of data transmitted to the first TRP relative to the total amount of data transmitted to each of the set of TRPs. In some examples of the method, apparatuses, and non-transitory computer-readable medium described herein, the ratio may be provided in the first reporting configuration.

Some examples of the method, apparatuses, and non-transitory computer-readable medium described herein may further include operations, features, means, or instructions for transmitting, prior to transmitting the reporting information, a first scheduling request (SR) to a first TRP of the one or more TRPs and one or more additional SRs to one or more other TRPs of the one or more TRPs, canceling the first SR responsive to the transmitting the reporting information to the first TRP, and maintaining the one or more additional SRs of the one or more other TRPs. In some examples of the method, apparatuses, and non-transitory computer-readable medium described herein, the reporting information may include operations, features, means, or instructions for determining, based on the first reporting configuration, to transmit the SR to only a first TRP of the set of TRPs or to multiple TRPs of the set of TRPs.

In some examples of the method, apparatuses, and non-transitory computer-readable medium described herein, the reporting information includes a PHR. In some examples of the method, apparatuses, and non-transitory computer-readable medium described herein, the PHR may be a joint PHR that includes separate power headroom information for uplink transmission to each of the set of TRPs. In some examples of the method, apparatuses, and non-transitory computer-readable medium described herein, the joint PHR may be based on a received transmission associated with an uplink grant received from a first TRP of the set of TRPs and a reference transmission associated with at least one other of the set of TRPs. In some examples of the method, apparatuses, and non-transitory computer-readable medium described herein, the reference transmission associated with the at least one other of the set of TRPs may be used for the PHR based on whether an uplink grant is received from an associated TRP of the one or more other TRPs subsequent to a trigger that initiates the PHR. In some examples of the method, apparatuses, and non-transitory computer-readable medium described herein, the PHR includes power headroom information for a first TRP of the set of TRPs, and one or more other PHRs that include power headroom information for one or more other TRPs of the set of TRPs may be separately transmitted based on independent PHR procedures at each of the one or more other TRPs.

Some examples of the method, apparatuses, and non-transitory computer-readable medium described herein may further include operations, features, means, or instructions for receiving, from at least one of the set of TRPs, configuration information indicating at least one of the set of reporting configurations for transmitting the reporting information.

A method of wireless communication at a first TRP of a set of TRPs is described. The method may include establishing a first wireless connection with a UE, identifying that a second TRP of the set of TRPs has established a second wireless connection with the UE, transmitting, to the UE, configuration information that indicates which of a set of available reporting configurations is to be used by the UE to transmit reporting information for one or more of a BSR or a PHR to at least one of the first TRP or the second TRP, and receiving reporting information from the UE responsive at least in part to the transmitted configuration information.

An apparatus for wireless communication at a first TRP of a set of TRPs is described. The apparatus may include a processor, memory in electronic communication with the processor, and instructions stored in the memory. The instructions may be executable by the processor to cause the apparatus to establish a first wireless connection with a UE, identify that a second TRP of the set of TRPs has established a second wireless connection with the UE, transmit, to the UE, configuration information that indicates which of a set of available reporting configurations is to be used by the UE to transmit reporting information for one or more of a BSR or a PHR to at least one of the first TRP or the second TRP, and receive reporting information from the UE responsive at least in part to the transmitted configuration information.

Another apparatus for wireless communication at a first TRP of a set of TRPs is described. The apparatus may include means for establishing a first wireless connection with a UE, identifying that a second TRP of the set of TRPs has established a second wireless connection with the UE, transmitting, to the UE, configuration information that indicates which of a set of available reporting configurations is to be used by the UE to transmit reporting information for one or more of a BSR or a PHR to at least one of the first TRP or the second TRP, and receiving reporting information from the UE responsive at least in part to the transmitted configuration information.

A non-transitory computer-readable medium storing code for wireless communication at a first TRP of a set of TRPs is described. The code may include instructions executable by a processor to establish a first wireless connection with a UE, identify that a second TRP of the set of TRPs has established a second wireless connection with the UE, transmit, to the UE, configuration information that indicates which of a set of available reporting configurations is to be used by the UE to transmit reporting information for one or more of a BSR or a PHR to at least one of the first TRP or the second TRP, and receive reporting information from the UE responsive at least in part to the transmitted configuration information.

Some examples of the method, apparatuses, and non-transitory computer-readable medium described herein may further include operations, features, means, or instructions for determining, responsive to identifying that the second TRP may have established the second wireless connection with the UE, that a backhaul communications link between the first TRP and the second TRP may have a latency that exceeds a threshold value, determining that a first reporting configuration of the set of available reporting configurations is to be used by the UE based on the latency exceeding the threshold value, where the first reporting configuration provides separate reporting information transmissions for each of the first TRP and the second TRP, and formatting the configuration information to indicate the first reporting configuration.

Some examples of the method, apparatuses, and non-transitory computer-readable medium described herein may further include operations, features, means, or instructions for determining, responsive to identifying that the second TRP may have established the second wireless connection with the UE, that a backhaul communications link between the first TRP and the second TRP may have a latency that is at or below a threshold value, determining that a second reporting configuration of the set of available reporting configurations is to be used by the UE based on the latency being at or below the threshold value, where the second reporting configuration provides joint reporting information for both the first TRP and the second TRP, and formatting the configuration information to indicate the second reporting configuration.

In some examples of the method, apparatuses, and non-transitory computer-readable medium described herein, the reporting information includes a buffer status report (BSR). Some examples of the method, apparatuses, and non-transitory computer-readable medium described herein may further include operations, features, means, or instructions for transmitting an uplink grant to the UE that provides at least an indication of which of the set of reporting configurations is to be used by the UE for the BSR.

In some examples of the method, apparatuses, and non-transitory computer-readable medium described herein, the BSR indicates a current buffer status of the UE irrespective of any potential uplink transmissions between the UE and the second TRP. In some examples of the method, apparatuses, and non-transitory computer-readable medium described herein, the BSR provides an adjusted buffer status from a current buffer status of the UE based on a ratio of data transmitted to the first TRP relative to a total amount of uplink data transmitted between the UE and the set of TRPs. Some examples of the method, apparatuses, and non-transitory computer-readable medium described herein may further include operations, features, means, or instructions for configuring the UE to estimate the adjusted buffer status based on past amounts of data transmitted via the first TRP relative to the total amount of uplink data transmitted between the UE and the set of TRPs. Some examples of the method, apparatuses, and non-transitory computer-readable medium described herein may further include operations, features, means, or instructions for configuring the UE with the ratio as part of a first reporting configuration provided to the UE by the first TRP.

In some examples of the method, apparatuses, and non-transitory computer-readable medium described herein, the reporting information includes a PHR. In some examples of the method, apparatuses, and non-transitory computer-readable medium described herein, the PHR may be a joint PHR that includes separate power headroom information for each of the first TRP and the second TRP, and where the first TRP provides power headroom information from the joint PHR to the second TRP via a backhaul link. Some examples of the method, apparatuses, and non-transitory computer-readable medium described herein may further include operations, features, means, or instructions for transmitting, to the UE, configuration information that includes the set of reporting configurations available for transmitting the reporting information.

A method of wireless communication at a UE is described. The method may include establishing wireless connections with a set of TRPs on a shared radio frequency spectrum band, identifying one or more logical channel transmissions, or one or more MAC CEs, or a combination thereof, that are to be transmitted to the set of TRPs, identifying a CAPC associated with each of the logical channel transmissions, or the one or more MAC CEs, or the combination thereof, determining, based on the identified CAPCs, a single CAPC to use in a common LBT procedure to initiate transmissions to the set of TRPs, and performing the common LBT procedure, based on the determined single CAPC, to access the shared radio frequency spectrum band.

An apparatus for wireless communication at a UE is described. The apparatus may include a processor, memory in electronic communication with the processor, and instructions stored in the memory. The instructions may be executable by the processor to cause the apparatus to establish wireless connections with a set of TRPs on a shared radio frequency spectrum band, identify one or more logical channel transmissions, or one or more MAC CEs, or a combination thereof, that are to be transmitted to the set of TRPs, identify a CAPC associated with each of the logical channel transmissions, or the one or more MAC CEs, or the combination thereof, determine, based on the identified CAPCs, a single CAPC to use in a common LBT procedure to initiate transmissions to the set of TRPs, and perform the common LBT procedure, based on the determined single CAPC, to access the shared radio frequency spectrum band.

Another apparatus for wireless communication at a UE is described. The apparatus may include means for establishing wireless connections with a set of TRPs on a shared radio frequency spectrum band, identifying one or more logical channel transmissions, or one or more MAC CEs, or a combination thereof, that are to be transmitted to the set of TRPs, identifying a CAPC associated with each of the logical channel transmissions, or the one or more MAC CEs, or the combination thereof, determining, based on the identified CAPCs, a single CAPC to use in a common LBT procedure to initiate transmissions to the set of TRPs, and performing the common LBT procedure, based on the determined single CAPC, to access the shared radio frequency spectrum band.

A non-transitory computer-readable medium storing code for wireless communication at a UE is described. The code may include instructions executable by a processor to establish wireless connections with a set of TRPs on a shared radio frequency spectrum band, identify one or more logical channel transmissions, or one or more MAC CEs, or a combination thereof, that are to be transmitted to the set of TRPs, identify a CAPC associated with each of the logical channel transmissions, or the one or more MAC CEs, or the combination thereof, determine, based on the identified CAPCs, a single CAPC to use in a common LBT procedure to initiate transmissions to the set of TRPs, and perform the common LBT procedure, based on the determined single CAPC, to access the shared radio frequency spectrum band.

Some examples of the method, apparatuses, and non-transitory computer-readable medium described herein may further include operations, features, means, or instructions for determining, based on the determined single CAPC, one or more LBT parameters for the LBT procedure. In some examples of the method, apparatuses, and non-transitory computer-readable medium described herein, the determining may include operations, features, means, or instructions for determining that only logical channel transmissions are to be transmitted to each of the set of TRPs during a transmission opportunity associated with the LBT procedure, and determining a lowest CAPC associated with each of the logical channel transmissions as the single CAPC for use in the common LBT procedure. In some examples of the method, apparatuses, and non-transitory computer-readable medium described herein, the determining may include operations, features, means, or instructions for determining that a MAC CE is to be transmitted to at least one of the set of TRPs during a transmission opportunity associated with the LBT procedure, and determining a highest available CAPC as the same CAPC for use in the common LBT procedure. In some examples of the method, apparatuses, and non-transitory computer-readable medium described herein, the determining further may include operations, features, means, or instructions for determining that the MAC CE is different than a padding BSR MAC CE.

Some examples of the method, apparatuses, and non-transitory computer-readable medium described herein may further include operations, features, means, or instructions for receiving configuration information for performing the common LBT procedure, the configuration information indicating a first LBT configuration of set of available LBT configurations, where the first LBT configuration provides that the single CAPC is to be used in the common LBT procedure, and where a second LBT configuration of the set of available LBT configurations provides that independent CAPCs associated with each of the set of TRPs is to be used in independent LBT procedures to separately initiate transmissions to each of the set of TRPs.

DETAILED DESCRIPTION

Figure 1:
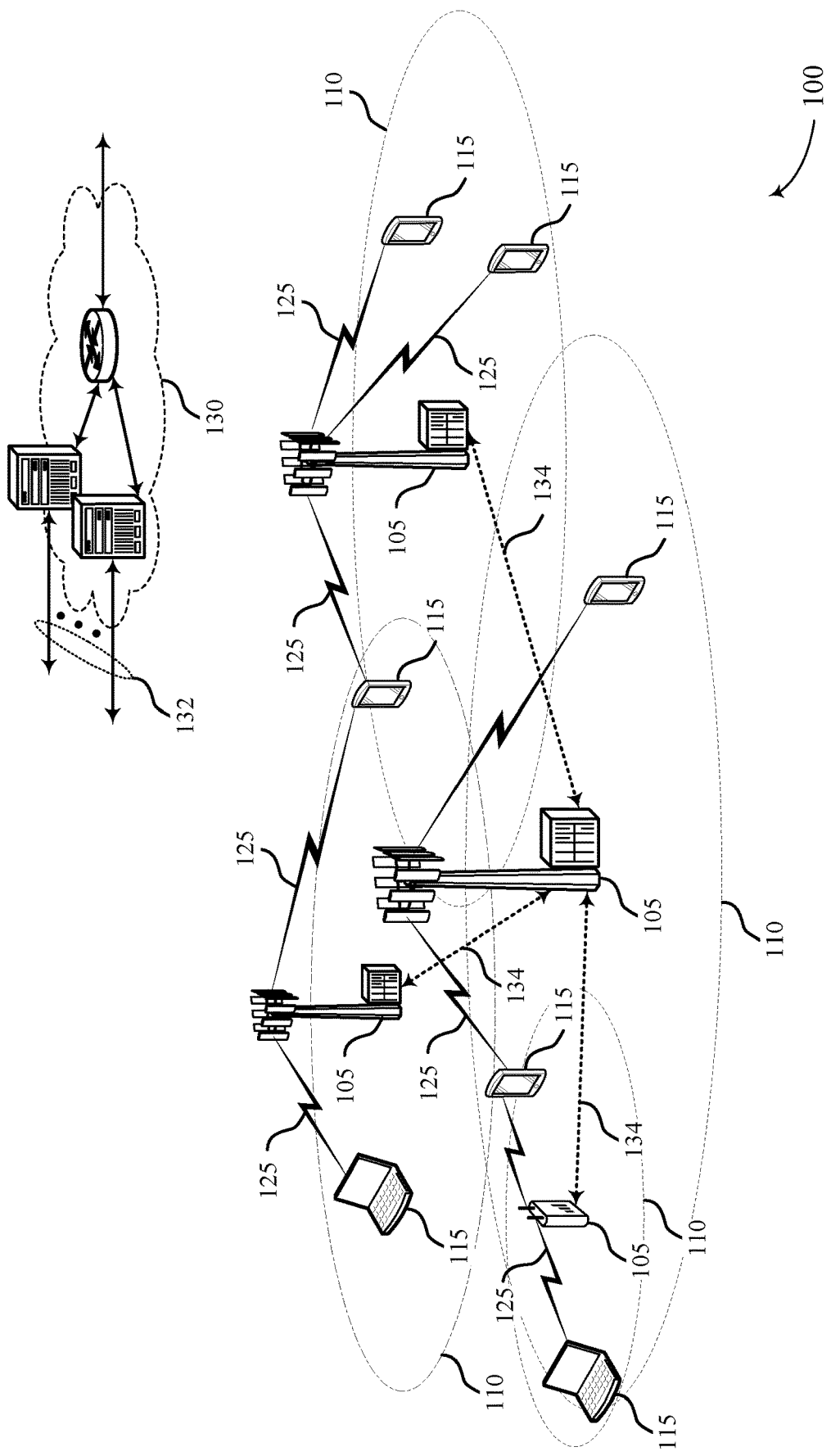
FIG. 1 illustrates an example of a system for wireless communications that supports uplink reporting techniques for multi transmission-reception point transmissions in accordance with aspects of the present disclosure.

In various aspects, the present disclosure provides user equipment (UE) reporting techniques for multiple concurrent wireless connections with multiple different transmission-reception points (TRPs). In some aspects, a UE may identify a reporting configuration and transmit a report (e.g., a buffer status report (BSR), power headroom report (PHR), or combinations thereof) to one or more of the TRPs based on the identified reporting configuration. In some cases, the multiple TRPs may have non-ideal backhaul connections (e.g., backhaul connections with a latency that exceeds a predetermined threshold value), and the identified reporting configuration may allow the UE to transmit separate reports to different TRPs. In such cases, the different TRPs may receive the separate reports and use information contained therein for corresponding communications with the UE. In some cases, the multiple TRPs may have ideal backhaul connections (e.g., backhaul connections with a latency that is at or below the predetermined threshold value), and the UE may use a reporting configuration in which a single report is transmitted from the UE to one TRP. The receiving TRP may then, in such cases, share information contained in the report with one or more other TRPs via the backhaul connection.

In some cases, the UE may receive an indication of the reporting configuration from a TRP. For example, the UE may be configured to provide a single report to one of the TRPs when an ideal backhaul is present, and to provide separate reports to each TRP when a non-ideal backhaul is present. In some cases, the UE may have a reporting configuration for a single report and the report transmitted by the UE may be a BSR. In such examples, the single BSR may be transmitted to a TRP that issues an uplink grant to the UE. In some cases, the UE may have multiple concurrent uplink grants to multiple TRPs (e.g., using multiple antenna panels at the UE), and the UE may select which TRP to which to send the BSR. In some cases, the UE may select the TRP based on one or more factors, such as a size of the uplink grant (e.g., the BSR is transmitted using the uplink grant with the most resources), a modulation and coding scheme of the uplink grant (e.g., the BSR is transmitted using the uplink grant with the highest MCS), channel conditions between the UE and TRPs, random selection, or any combinations thereof.

In cases where the reporting configuration provides that separate transmissions are to be transmitted to separate TRPs (e.g., due to non-ideal backhaul between TRPs), each TRP may configure separate BSR configurations, and the UE may transmit the BSR to each TRP in accordance with the TRP BSR configuration. In some cases, the UE may report BSR based on its current buffer status, excluding the data scheduled in current PUSCH, and the BSR does not account for data which could be scheduled by other TRPs. In such cases, the multiple TRPs may coordinate a traffic split ratio semi-statically for UL scheduling, for example. In other cases, the UE may report BSR based on its current buffer status and also account for potential data scheduled by the other TRP(s). In such cases, the UE may estimate the traffic split ratio based on past statistics. Additionally or alternatively, the TRPs may indicate to UE on the amount of traffic split ratio semi-statically (e.g., via radio resource control (RRC) signaling). The UE in such cases may discount the data to one TRP when reporting BSR to another TRP based on the traffic split ratio.

In some cases, a UE may transmit a scheduling request (SR) to one or more TRPs, which may be used to request uplink shared channel resources for a new uplink transmission. However, when a BSR is transmitted some systems may specify that any pending SRs are canceled, because the BSR provides information on the buffer status at the UE that can be used to schedule uplink transmissions. In cases where SRs are transmitted to multiple TRPs, and the TRPs have non-ideal backhaul, such behavior may result in a SR being canceled for a TRP that does not receive the BSR even though the UE may still have uplink data for transmission. Accordingly, in some aspects of the present disclosure, when a BSR is sent to a first TRP, pending SR(s) are not canceled at other TRPs if the UE still has uplink data. For example, the UE may transmit a BSR (e.g., via a physical uplink shared channel (PUSCH)) to the first TRP and a SR (e.g., via a physical uplink control channel (PUCCH)) to a second TRP. Additionally or alternatively, when BSR or SR is triggered and the UE does not have an uplink grant, the UE can send SR to multiple TRPs (e.g., on separate PUCCH transmissions that can be simultaneous if UE has multiple antenna panels or MIMO capability, or on different OFDM symbols/slots). In some cases, the UE may choose to send SR to multiple TRPs or only one TRP (or fewer than all available TRPs) depending on, for example, an amount of data in the UE buffer.

In some cases, the reporting information transmitted by a UE may include a PHR. In some cases, the UE may transmit a joint PHR that includes power headroom information for each concurrent uplink transmission of the UE (e.g., a power headroom indication for each antenna panel to be used for concurrent uplink transmissions). In such cases, a single PHR configuration may be used for PHR reporting. In other cases, The UE may transmit separate PHR reports for each TRP or each uplink panel to be used for concurrent uplink transmissions from UE. In such cases, each TRP may configure a separate PHR configuration at the UE, and may receive the associated PHR. Such examples may allow a TRP to determine UE power headroom in cases where TRPs have non-ideal backhaul.

In some cases, the UE and TRPs may use shared radio frequency spectrum (e.g., unlicensed spectrum) for communications, and may access the shared radio frequency spectrum using contention-based channel access techniques. In some cases, a UE may use a channel access priority class (CAPC) to determine one or more parameters for contention-based channel access, such as parameters for a listen-before-talk (LBT) procedure. In cases where the UE is to transmit concurrently to multiple TRPs, a single CAPC may be determined for an LBT procedure. In some cases, the single CAPC may be determined based on one or more logical channel transmissions or medium access control (MAC) control element (CE) transmissions within a transmission opportunity (TxOP) associated with the LBT procedure. For example, if a MAC CE is to be transmitted (with the exception of a padding BSR) a highest CAPC may be selected for the LBT procedure, and otherwise a lowest CAPC of the logical channel transmissions may be selected for the LBT procedure. In some cases, CAPC may be determined independently for separate LBT procedures for different TRPs.

Such techniques may allow for UE communications with multiple TRPs in which two or more concurrent uplink transmissions (e.g., using MIMO techniques, different antenna panels at the UE, etc.) may be provided to different TRPs that may or may not have an ideal backhaul connection. Such concurrent transmissions may enhance the reliability and capacity of a system. Further, such techniques may allow for more efficient resource utilization in cases where TRPs have non-ideal backhaul links by allowing TRPs that have available resources to schedule a UE in the uplink with less coordination with one or more other TRPs that may also schedule resources for the UE.

Aspects of the disclosure are initially described in the context of exemplary wireless communications systems and process flows. Aspects of the disclosure are further illustrated by and described with reference to apparatus diagrams, system diagrams, and flowcharts that relate to uplink reporting techniques for multi-TRP transmissions.

FIG. 1 illustrates an example of a wireless communications system 100 that supports uplink reporting techniques for multi transmission-reception point transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, UEs 115 may have capability to support multiple concurrent uplink connections with multiple base stations 105 or multiple TRPs, and may provide one or more reports to one or more base stations 105 in accordance with techniques discussed herein. In some cases, a base station 105 may include one or more TRPs, or different TRPs may be associated with different base stations 105. The terms TRP and base station may be used interchangeably herein with the understanding that two or more TRPs may be associated with a single base station 105 (e.g., as separate radio heads or separate antenna panels that each act as a TRP).

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, one or more UEs 115 may establish connections via multiple concurrent wireless connections with multiple base stations 105 or TRPs. Such UEs may identify a reporting configuration and transmit a report (e.g., a BSR, PHR, SR, or combinations thereof) to one or more of the base stations 105 or TRPs based on the identified reporting configuration. In some cases, multiple TRPs may have non-ideal backhaul connections (e.g., TRPs associated with different base stations 105 that have wireless backhaul links with a constrained capacity or data rate), and the reporting configuration may allow the UE to transmit separate reports to different TRPs. The different TRPs may then use the separate reports for corresponding communications with the UE 115. In some cases, the multiple TRPs may have ideal backhaul connections (e.g., TRPs associated with a same base station 105 or that have wireline backhaul links with sufficient capacity and data rates to support coordination between TRPs for UE 115 scheduling), and the UE may use a reporting configuration in which a single report from the UE to one TRP may be shared with other TRPs.

In some cases, the UE 115 and base stations 105 may use shared radio frequency spectrum for communications, and may access the shared radio frequency spectrum using contention-based channel access techniques. In some cases, a UE 115 may use a CAPC to determine one or more parameters for contention-based channel access, such as parameters for an LBT procedure. In cases where the UE 115 is to transmit concurrently to multiple base stations 105, a single CAPC may be determined for an LBT procedure. In some cases, the single CAPC may be determined based on one or more logical channel transmissions or MAC CE transmissions within a TxOP associated with the LBT procedure. For example, if a MAC CE is to be transmitted (with the exception of a padding BSR MAC CE) a highest CAPC may be selected for the LBT procedure, and otherwise a lowest CAPC of the logical channel transmissions may be selected for the LBT procedure. In some cases, CAPC may be determined independently for separate LBT procedures for different base stations 105.

Figure 2:
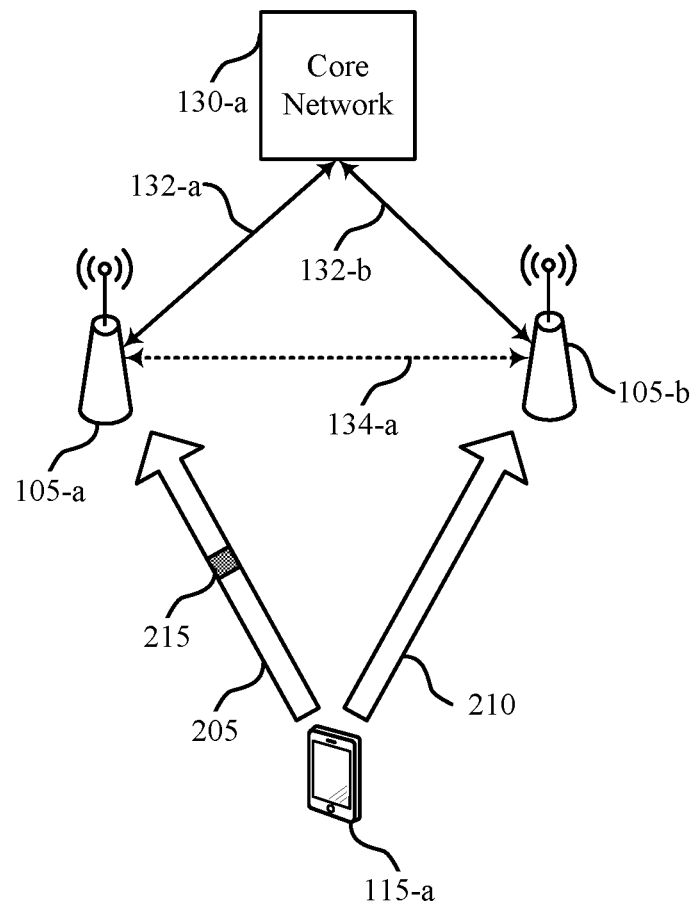
FIG. 2 illustrates an example of a portion of a wireless communications system that supports uplink reporting techniques for multi transmission-reception point transmissions in accordance with aspects of the present disclosure.

FIG. 2 illustrates an example of a wireless communications system 200 that supports uplink reporting techniques for multi transmission-reception point transmissions in accordance with aspects of the present disclosure. The wireless communications system 200 may include a first TRP 105-*a*, a second TRP 105-*b*, and UE 115-*a*, which may be examples of the corresponding devices described with reference to FIG. 1. In this example, TRPs 105 may communicate with each other via a backhaul link 134-*a*, and with a core network 130-*a* via backhaul links 132. In this case, the UE 115-*a* may have multiple concurrent connections with each TRP 105, including a first connection 205 with the first TRP 105-*a* and a second connection 210 with the second TRP 105-*b*.

In this example, the backhaul link 134-*a* may provide an ideal backhaul that supports close coordination between the first TRP 105-*a* and the second TRP 105-*b*. In some cases, an ideal backhaul link provides communications latency between the first TRP 105-*a* and the second TRP 105-*b* that is at or below a threshold value (e.g., a latency that may be less than a predetermined time). In other cases, such as described with respect to FIG. 3, the backhaul link 134-*a* may have a relatively low data rate, or relatively constrained capacity, which may result in a non-ideal backhaul between the first TRP 105-*a* and the second TRP 105-*b*. In other cases, backhaul link 134-*a* may not be present and the first TRP 105-*a* and the second TRP 105-*b* may communicate via the core network 130-*a* and respective backhaul links 132 with the core network 130-*a*.

The UE 115-*a* may establish connections with the TRPs 105 and as part of the connection establishments, or after the connections are established, may identify a reporting configuration and transmit one or more reports for use by the TRPs 105 in scheduling uplink resources at the UE 115-*a*. For example, the UE 115-*a* may transmit a BSR that indicates a buffer status of the UE 115-*a* and that the TRPs 105 may use to determine an amount of resources to be allocated to the UE 115-*a*. Additionally or alternatively, the UE may transmit a PHR that indicates a power headroom associated with each of the first connection 205 and the second connection 210, and that the TRPs 105 may use to determine one or more parameters (e.g., an MCS) for uplink transmissions of the UE 115-*a*. In some cases, a number of different reporting configurations may be available for transmitting the reports from the UE 115-*a*. Such reporting configurations may include, for example, reporting configurations for use in cases where ideal backhaul is present, and other reporting configurations for use in cases where non-ideal backhaul is present. In some cases, the number of different reporting configurations may be signaled to the UE 115-*a*, or may be predetermined and known by the UE 115-*a* and the TRPs 105 (e.g., according to a NR specification).

Figure 3:
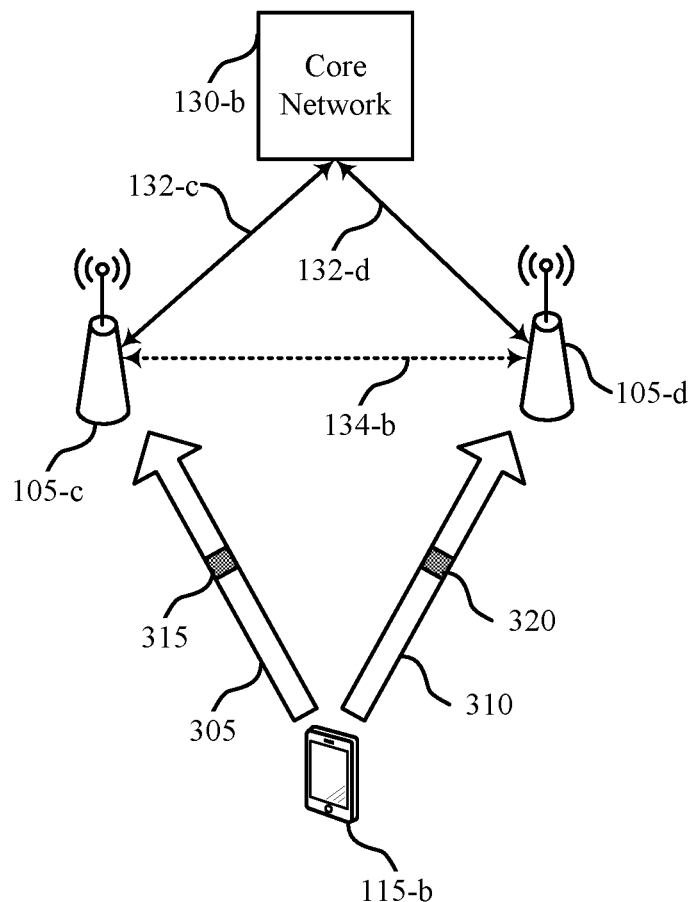
FIG. 3 illustrates another example of a portion of a wireless communications system that supports uplink reporting techniques for multi transmission-reception point transmissions in accordance with aspects of the present disclosure.

In the example of FIG. 3, the TRPs 105 may have ideal backhaul connections (e.g., backhaul connections with a latency that is at or below the predetermined threshold value), and the UE 115-*a* may use a reporting configuration in which a single reporting information 215 transmission is provided from the UE to the first TRP 105-*a*. The first TRP 105-*a*, based on the information in the reporting information 215, may share information provided by the UE 115-*a* (e.g., BSR information, PHR information, etc.) with the second TRP 105-*b*, and any other TRPs to which the UE 115-*a* may be connected, via the backhaul link 134-*a*.

In some cases, the first TRP 105-*a* or the second TRP 105-*b* may configure the UE 115-*a* with the reporting configuration in which the single reporting information 215 transmission may include a BSR. In such examples, the first TRP 105-*a* may transmit an uplink grant to the UE 115-*a*, and a single BSR may be transmitted to the first TRP 105-*a* according to a single BSR configuration. In other cases, both the first TRP 105-*a* and the second TRP 105-*b* may each provide an uplink grant to the UE 115-*a* for simultaneous uplink transmissions, and the UE 115-*a* may select which TRP 105 to which to send the BSR. In some cases, the UE 115-*a* may select the TRP 105 based on one or more factors, such as a size of the uplink grant (e.g., the BSR is transmitted using the uplink grant with the most resources), a modulation and coding scheme of the uplink grant (e.g., the BSR is transmitted using the uplink grant with the highest MCS), channel conditions between the UE 115-*a* and TRPs 105, random selection, or any combinations thereof. Such techniques may provide benefits and enhancements to the operation of the UE 115-*a* and TRPs 105. For example, UE 115-*a* may select one TRP 105 to which to send the BSR based on the reporting configuration, which may reduce processing overhead and power consumption associated with multiple BSR transmissions, among other advantages. Further, in some cases TRPs 105 may identify whether to monitor for a BSR, which may provide for more efficient use of resources of TRP 105, among other advantages.

Additionally or alternatively, the first TRP 105-*a* or the second TRP 105-*b* may configure the UE 115-*a* with the reporting configuration in which the single reporting information 215 transmission may include a PHR. In some cases, the UE 115-*a* may transmit a joint PHR that includes power headroom information for each concurrent uplink transmission of the UE 115-*a* (e.g., a power headroom indication for the first connection 205 and for the second connection 210). For example, the UE 115-*a* may use two antenna panels for concurrent uplink transmissions, and a separate PHR for each antenna panel may be provided in the joint PHR. In such cases, a single PHR configuration may be used for PHR reporting. In some cases, depending on the uplink scheduling, the power headroom for the first connection 205 (e.g., for a first uplink antenna panel) may be based on a real transmission from the first TRP 105-*a*, and the power headroom for the second connection 210 (e.g., for a second uplink antenna panel) may be based on reference transmission. In some cases, the UE 115-*a* may determine whether the power headroom value for a given connection, including first connection 205 through second connection 210 panel is based on a real transmission or a reference format based at least in part on whether the first uplink grant for a new transmission is received since a PHR has been triggered. Such techniques may provide benefits and enhancements to the operation of the UE 115-*a* and TRPs 105. For example, UE 115-*a* may select one TRP 105 to which to send the PHR, which may reduce processing overhead and power consumption associated with multiple PHR transmissions, among other advantages. Further, in some cases TRPs 105 may identify whether to monitor for a PHR, which may provide for more efficient use of TRP 105 resources, among other advantages.

FIG. 3 illustrates an example of a wireless communications system 300 that supports uplink reporting techniques for multi transmission-reception point transmissions in accordance with aspects of the present disclosure. In some examples, wireless communications system 300 may include a first TRP 105-*c*, a second TRP 105-*d*, and UE 115-*b*, which may be examples of the corresponding devices described with reference to FIG. 1 or 2. In this example, TRPs 105 may communicate with each other via a backhaul link 134-*b*, and with a core network 130-*b* via backhaul links 132. In this case, the UE 115-*b* may have multiple concurrent connections with each TRP 105, including a first connection 305 with the first TRP 105-*b* and a second connection 310 with the second TRP 105-*d*.

In this example, the backhaul link 134-*b* may provide a non-ideal backhaul that does not support close coordination between the first TRP 105-*a* and the second TRP 105-*b*. For example, backhaul link 134-*b* may be a wireless link having a relatively low capacity or data rates, which result in latency in communications between the first TRP 105-*c* and second TRP 105-*d* (e.g., a latency that exceeds a predetermined threshold value). In other cases, backhaul link 134-*b* may not be present and the first TRP 105-*c* and the second TRP 105-*d* may communicate via the core network 130-*b* and respective backhaul links 132 with the core network 130-*b*, which may result in a communication latency between the TRPs 105 exceeding the predetermined threshold value.

In some cases, based on the backhaul communications between the TRPs 105, the reporting configuration at the UE 115-*b* may provide that separate transmissions are to be transmitted to the separate TRPs 105, and the UE 115-*b* may transmit first reporting information 315 to the first TRP 105-*c* and may transmit second reporting information 320 to the second TRP 105-*d*. In such cases, each TRP 105 may provide separate configurations for reporting, such as by providing separate BSR and PHR configurations. In cases where the first reporting information 315 and the second reporting information 320 include BSRs, the UE 115-*b* may transmit the BSR to each TRP 105 in accordance with the BSR configuration of the associated TRP 105. In some cases, the UE 115-*b* may report BSR based on its current buffer status, excluding the data scheduled in current PUSCH, and the BSR does not account for data which could be scheduled by other TRP 105. In some cases, the first TRP 105-*c* and the second TRP 105-*d* may coordinate a traffic split ratio semi-statically for uplink scheduling. In other cases, the UE 115-*b* may report BSR based on its current buffer status and also account for potential data scheduled by the other TRPs 105. In some cases, the UE 115-*b* may estimate the traffic split ratio based on past statistics (e.g., based on a percentage of uplink data transmitted to each of the first TRP 105-*c* and the second TRP 105-*d* for a particular time period or during a current active connection). Additionally or alternatively, the TRPs 105 may indicate to UE 115-*b* on the amount of traffic split ratio semi-statically (e.g., via RRC signaling). The UE 115-*b* in such cases may discount the reported BSR data based on the traffic split ratio. For example, if 30 percent of the uplink traffic is transmitted to the first TRP 105-*c*, the UE 115-*b* may transmit a first BSR to the first TRP 105-*c* that has a 70 percent reduction in the reported buffer, and may transmit a second BSR to the second TRP 105-*d* that has a 30 percent reduction in the reported buffer. In other cases, the amount of the adjustment to the reported buffer size may be less than an actual or configured percentage or ratio associated with a particular TRP, to help ensure that sufficient uplink resources are allocated to the UE 115-*b*.

In some cases, the UE 115-*b* may transmit a scheduling request (SR) to the first TRP 105-*c* and the second TRP 105-*d*, which may be used to request uplink shared channel resources for a new uplink transmission. In some cases, when the BSR is sent to the first TRP 105-*c*, pending SR(s) are not canceled at the second TRP 105-*d* if the UE 115-*b* still has uplink data. For example, the UE 115-*b* may transmit a BSR in the first reporting information 315 (e.g., via a PUSCH) to the first TRP 105-*c* and a SR (e.g., via a PUCCH) to the second TRP 105-*d*. Additionally or alternatively, when BSR or SR is triggered and the UE 115-*b* does not have an uplink grant, the UE 115-*b* may send SR to both TRPs 105 (e.g., on separate simultaneous PUCCH transmissions, or on different OFDM symbols/slots). In some cases, the UE 115-*b* may choose to send SR to both TRPs 105 or only one TRP 105 depending on, for example, an amount of data in the UE 115-*b* buffer.

Additionally or alternatively, the first TRP 105-*c* or the second TRP 105-*d* may configure the UE 115-*b* with the reporting configuration in which the first reporting information 315 and the second reporting information 320 may include a PHR. In such cases, the UE 115-*b* may transmit separate PHR reports for each TRP 105. In some cases, each TRP 105 may configure a separate PHR configuration at the UE 115-*b*, and may receive the associated PHR. Such examples may allow a TRP 105 to determine UE 115-*b* power headroom separately, and schedule uplink transmissions in accordance with the indicated power headroom. In some examples, the separate PHR configuration may have separate associated parameters. For example, a separate phr-ProhibitTimer may be maintained at the UE 115-*b* for each TRP 105 and, if running, does not affect the PHR trigger on the other TRP 105.

Such techniques performed by the TRPs 105 and the UE 115-*b* may provide improvements to TRP 105 and UE 115-*b* resource utilization. For example, in cases where TRPs 105 have non-ideal backhaul links, resource utilization may be improved by allowing a TRP 105 with available resources to schedule the UE 115-*b* in the uplink with less coordination with other TRPs 105 that may also schedule resources for the UE 115-*b*, among other advantages. Further, the UE 115-*b* may be scheduled with sufficient resources based on the current buffer status of the UE 115-*b*, which may enhance efficiency and reduce latency in communications from the UE 115-*b*, among other advantages.

In some cases, the UE 115-*b* and TRPs 105 may use shared radio frequency spectrum for communications, and may access the shared radio frequency spectrum using contention-based channel access techniques (e.g., using LBT procedures). In some cases, the UE 115-*b* may use a CAPC to determine one or more LBT parameters (e.g., a contention window duration, an initial backoff counter value, or combinations thereof). In cases where the UE 115-*b* is to transmit concurrently to the TRPs 105, a single CAPC may be determined for an LBT procedure. In some cases, the single CAPC may be determined based on one or more logical channel transmissions or MAC CE transmissions within a TxOP associated with the LBT procedure. For example, if a MAC CE is to be transmitted (with the exception of a padding BSR MAC CE) a highest CAPC may be selected for the LBT procedure, and otherwise a lowest CAPC of the logical channel transmissions may be selected for the LBT procedure. In other cases, CAPC may be determined independently, along with different contention windows and TxOP durations, for separate LBT procedures for the first TRP 105-*c* and the second TRP 105-*d*. In such cases, the UE 115-*b* may have different LBT success probability with a different contention window for each TRP 105.

Such techniques performed by the TRPs 105 and the UE 115-*b* may provide improvements to TRP 105 and UE 115-*b* efficiency when using shared spectrum. For example, power consumption and spectrum utilization may be improved by allowing the UE 115-*b* to select the CAPC for the LBT procedure based on the type of transmission and which TRP(s) 105 that are to receive the transmission, among other advantages.

Figure 4:
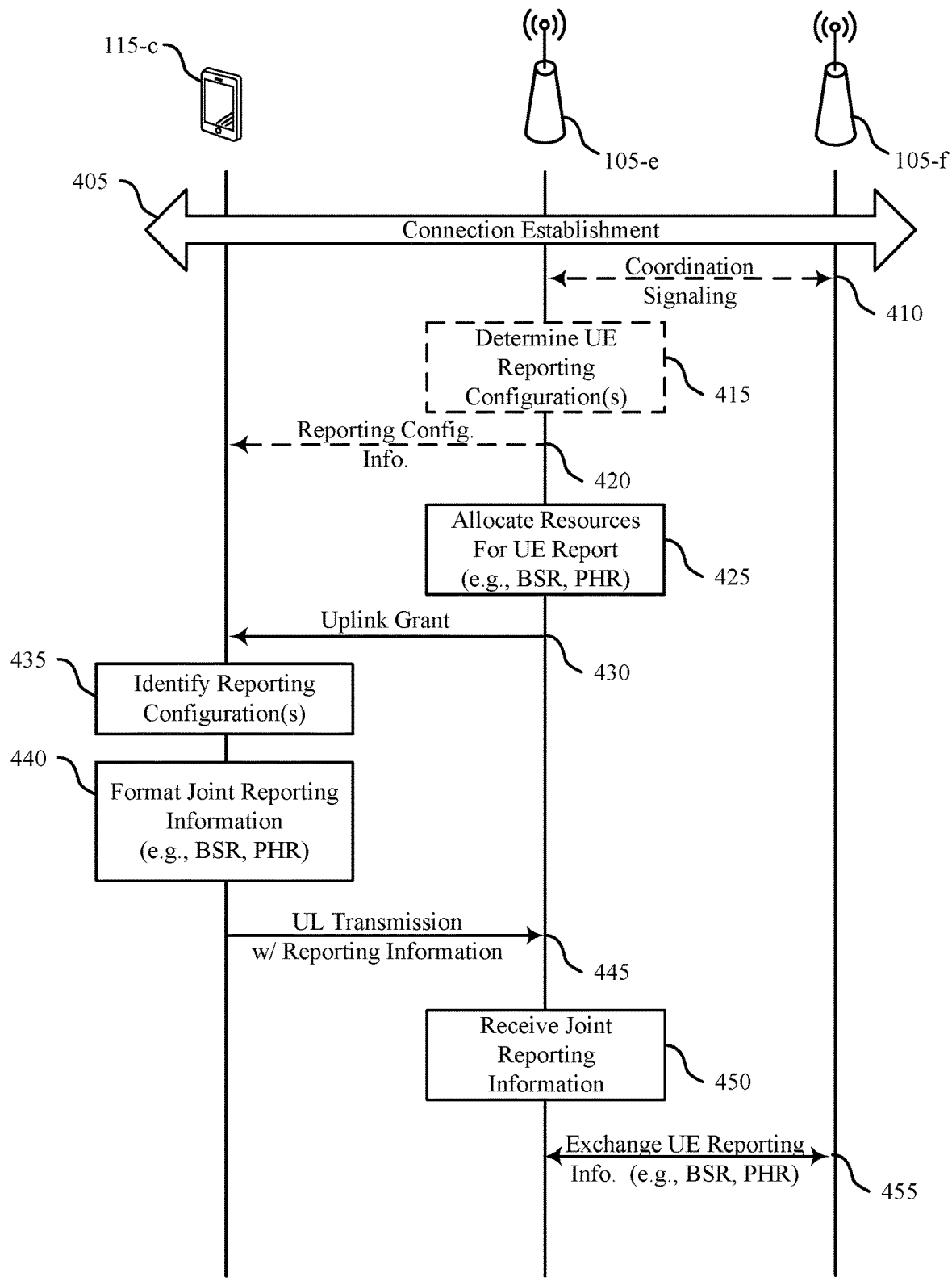
FIGS. 4 through 7 illustrate examples of process flows that support uplink reporting techniques for multi transmission-reception point transmissions in accordance with aspects of the present disclosure.

FIG. 4 illustrates an example of a process flow 400 that supports uplink reporting techniques for multi transmission-reception point transmissions in accordance with aspects of the present disclosure. The process flow 400 may include a UE 115-*c*, a first TRP 105-*e*, and a second TRP 105-*f*, which may be examples of the corresponding devices described with reference to FIGS. 1 through 3. TRPs 105 and UE 115-*c* may implement one or more techniques for uplink reporting as discussed herein. Alternative examples of the following may be implemented, where some steps are performed in a different order than described or are not performed at all. In some cases, steps may include additional features not mentioned below, or further steps may be added.

At 405, the UE 115-*c*, the first TRP 105-*e*, and the second TRP 105-*f* may establish wireless connections. Such wireless connections may be established in accordance with connection establishment techniques of a wireless network (e.g., a NR network), such as through RRC configuration of connections. The wireless connections may support multiple concurrent connections between the UE 115-*c* and the first TRP 105-*e* and second TRP 105-*f*. The multiple connections may provide concurrent downlink transmissions, concurrent uplink transmissions, or combinations thereof.

Optionally, at 410, the first TRP 105-*e* and the second TRP 105-*f* may exchange coordination signaling for concurrent communications with the UE 115-*c*. In this example, the first TRP 105-*e* and the second TRP 105-*f* may have a relatively robust backhaul connection that supports real-time dynamic coordination of communications between the TRPs 105 and the UE 115-*c* (e.g., an ideal backhaul link having a latency that is equal to or less than a predetermined threshold value).

Optionally, at 415, the first TRP 105-*e* may determine UE 115-*c* reporting configurations. In some cases, a number of different reporting configurations may be available, and one or more of the available reporting configurations may be selected based on the backhaul link status between the first TRP 105-*e* and the second TRP 105-*f*. For example, based on the ideal backhaul link, one or more reporting configurations that provide for joint BSR or PHR reports from the UE 115-*c* may be selected. The reporting configuration information may be transmitted, at 420, to the UE 115-*c*, in such cases.

At 425, the first TRP 105-*e* may allocate uplink resources for the UE 115-*c*, which may include resources for a UE 115-*c* report (e.g., PHR, BSR, etc.). In some cases, the first TRP 105-*e* may coordinate with the second TRP 105-*f* and allocate uplink resources to the UE 115-*c* in accordance with a separate uplink resource allocation that is to be made by the second TRP 105-*f*. At 430, the first TRP 105-*e* may transmit an uplink grant to the UE 115-*c*.

At 435, the UE 115-*c* may identify one or more reporting configurations for transmitting reporting information, such as a BSR or a PHR, to the first TRP 105-*e*. In this example, the reporting configurations may include one or more configurations that are associated with TRPs 105 having an ideal backhaul link. In some cases, the UE 115-*c* may determine a reporting configuration based on an RRC configured reporting configuration, or based on information included with the uplink grant from the first TRP 105-*e*. In this example, the UE 115-*c* may determine that a joint report is to be transmitted to the first TRP 105-*e*.

At 440, the UE 115-*c* may format reporting information into a joint report. In some cases, the joint report may be a BSR, and the UE 115-*c* may determine a current buffer status (less an amount of data to be transmitted that is associated with the received uplink grant), and format the buffer information into a BSR. In this example, a single BSR configuration may be used by the UE 115-*c*, as multiple different BSRs are not transmitted. Additionally or alternatively, the UE 115-*c* may format a PHR for transmission to the first TRP 105-*e*. In such cases, the UE 115-*c* may format a joint PHR that indicates power headroom value for each of the first TRP 105-*e* and the second TRP 105-*f*. The UE 115-*c*, at 445, may transmit the uplink transmission to the first TRP 105-*e*, which includes the formatted joint reporting information. In some cases, the UE 115-*c* may also transmit a concurrent uplink transmission to the second TRP 105-*f* that does not include reporting information. In some cases, the UE 115-*c* may have uplink grants from both TRPs 105, and may select which TRP 105 to which to send the reporting information (e.g., based on a size of associated uplink grants, channel conditions, MCS for each uplink transmission, etc.).

At 450, the first TRP 105-*e* may receive the joint reporting information from the UE 115-*c*. At 455, the first TRP 105-*e* may exchange information received from the UE 115-*c* with the second TRP 105-*f* (e.g., via a backhaul link), and the TRPs 105 may jointly determine further scheduling information for the UE 115-*c*.

The operations performed by the TRPs 105 and the UE 115-*c* as part of, but not limited to, process flow 400 may provide improvements to UE 115-*c* procedures for providing one or more reports (e.g., PHR, BSR, etc.). For example, the described reporting operations in the process flow 400 may support reduced power consumption and enhanced reliability for providing reporting information, among other advantages. Such techniques may allow for more reliable and efficient communications with multiple TRPs in which two or more concurrent uplink transmissions (e.g., using MIMO techniques, different antenna panels at the UE 115-*c*, etc.) may be provided to different TRPs 105 that may or may not have an ideal backhaul connection. Further, the operations performed by the TRPs 105 and the UE 115-*c* as part of, but not limited to, process flow 300 may provide benefits and enhancements to the operation of the TRPs 105. For example, the described joint report of the UE 115-*c* may support more efficient resource utilization at TRPs 105 by allowing the first TRP 105-*e* to monitor for the reporting information and the second TRP 105-*f* to use resources that would otherwise be used for monitoring for the reporting information, among other advantages.

Figure 5:
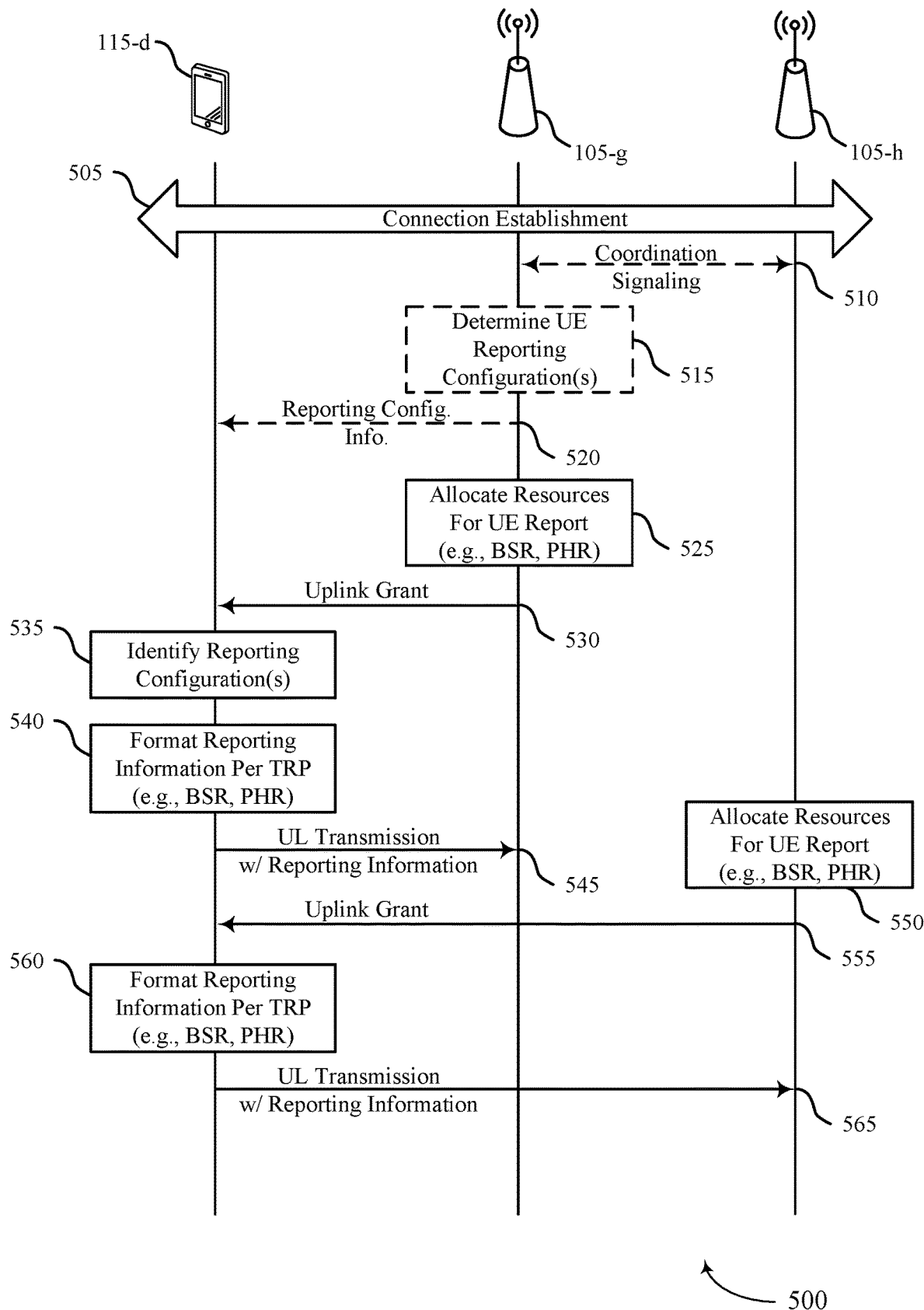

FIG. 5 illustrates an example of a process flow 500 that supports uplink reporting techniques for multi transmission-reception point transmissions in accordance with aspects of the present disclosure. The process flow 500 may include a UE 115-*d*, a first TRP 105-*g*, and a second TRP 105-*h*, which may be examples of the corresponding devices described with reference to FIGS. 1 through 4. TRPs 105 and UE 115-*d* may implement one or more techniques for uplink reporting as discussed herein. Alternative examples of the following may be implemented, where some steps are performed in a different order than described or are not performed at all. In some cases, steps may include additional features not mentioned below, or further steps may be added.

At 505, the UE 115-*d*, the first TRP 105-*g*, and the second TRP 105-*h* may establish wireless connections. Such wireless connections may be established in accordance with connection establishment techniques of a wireless network (e.g., a NR network), such as through RRC configuration of connections. The wireless connections may support multiple concurrent connections between the UE 115-*d* and the first TRP 105-*g* and second TRP 105-*h*. The multiple connections may provide concurrent downlink transmissions, concurrent uplink transmissions, or combinations thereof.

Optionally, at 510, the first TRP 105-*g* and the second TRP 105-*h* may exchange coordination signaling for concurrent communications with the UE 115-*d*. In this example, the first TRP 105-*g* and the second TRP 105-*h* may have a relatively slow or capacity constrained backhaul connection that does not support real-time dynamic coordination of communications between the TRPs 105 and the UE 115-*d* (e.g., a non-ideal backhaul link having a latency that exceeds a predetermined threshold value).

Optionally, at 515, the first TRP 105-*g* may determine UE 115-*d* reporting configurations. In some cases, a number of different reporting configurations may be available, and one or more of the available reporting configurations may be selected based on the backhaul link status between the first TRP 105-*g* and the second TRP 105-*h*. For example, based on the non-ideal backhaul link, one or more reporting configurations that provide for separate BSR or PHR reports from the UE 115-*d* may be selected. The reporting configuration information may be transmitted, at 520, to the UE 115-*d*, in such cases.

At 525, the first TRP 105-*g* may allocate uplink resources for the UE 115-*d*, which may include resources for a UE 115-*d* report (e.g., PHR, BSR, etc.). At 530, the first TRP 105-*g* may transmit an uplink grant to the UE 115-*d*.

At 535, the UE 115-*d* may identify one or more reporting configurations for transmitting reporting information, such as a BSR or a PHR, to the first TRP 105-*g* and the second TRP 105-*h*. In this example, the reporting configurations may include one or more configurations that are associated with TRPs 105 having a non-ideal backhaul link. In some cases, the UE 115-*d* may determine a reporting configuration based on an RRC configured reporting configuration, or based on information included with the uplink grant from the first TRP 105-*g*. In this example, the UE 115-*d* may determine that a separate reporting information is to be transmitted to the first TRP 105-*g* and the second TRP 105-*h*.

At 540, the UE 115-*d* may format reporting information into a report. In some cases, the report may be a BSR, and the UE 115-*d* may determine a current buffer status (less an amount of data to be transmitted that is associated with the received uplink grant), and format the buffer information into a BSR. In some configurations, the UE 115-*d* may simply report the current buffer status. In other configurations, the UE 115-*d* may adjust the current buffer status based on an amount of data expected to be transmitted to the second TRP 105-*h* (e.g., based on an estimation made at the UE 115-*d* or a configured traffic ratio provided to the UE 115-*d*). In this example, a separate BSR configurations for each TRP 105 may be used by the UE 115-*d*. Additionally or alternatively, the UE 115-*d* may format a PHR for transmission to the first TRP 105-*g*. In such cases, the UE 115-*d* may format a PHR that indicates power headroom value for the first TRP 105-*g*. The UE 115-*d*, at 545, may transmit the uplink transmission to the first TRP 105-*g*, which includes the reporting information.

At 550, the second TRP 105-*h* may allocate uplink resources for the UE 115-*d*, which may include resources for a UE 115-*d* report (e.g., PHR, BSR, etc.) to the second TRP 105-*h*. At 555, the second TRP 105-*h* may transmit an uplink grant to the UE 115-*d*.

At 560, the UE 115-*d* may format reporting information into a report based on the reporting configuration for the second TRP 105-*h*. In some cases, the report may be a BSR, and the UE 115-*d* may determine a current buffer status (less an amount of data to be transmitted that is associated with the received uplink grant), and format the buffer information into a BSR. In some configurations, the UE 115-*d* may simply report the current buffer status. In other configurations, the UE 115-*d* may adjust the current buffer status based on an amount of data expected to be transmitted to the first TRP 105-*g* (e.g., based on an estimation made at the UE 115-*d* or a configured traffic ratio provided to the UE 115-*d*). Additionally or alternatively, the UE 115-*d* may format a PHR for transmission to the second TRP 105-*h*. In such cases, the UE 115-*d* may format a PHR that indicates power headroom value for the second TRP 105-*h*. The UE 115-*d*, at 565, may transmit the uplink transmission to the second TRP 105-*h*, which includes the reporting information.

The operations performed by the TRPs 105 and the UE 115-*d* as part of, but not limited to, process flow 500 may provide improvements to UE 115-*d* procedures for providing one or more reports (e.g., PHR, BSR, etc.). For example, the described reporting operations in the process flow 400 may enhanced reliability for providing reporting information to TRPs 105 that may not have an ideal backhaul connection, among other advantages. Such techniques may allow for more reliable and efficient resource allocation among multiple TRPs 105 in which two or more concurrent uplink transmissions may be provided to the multiple TRPs 105, among other advantages.

Figure 6:
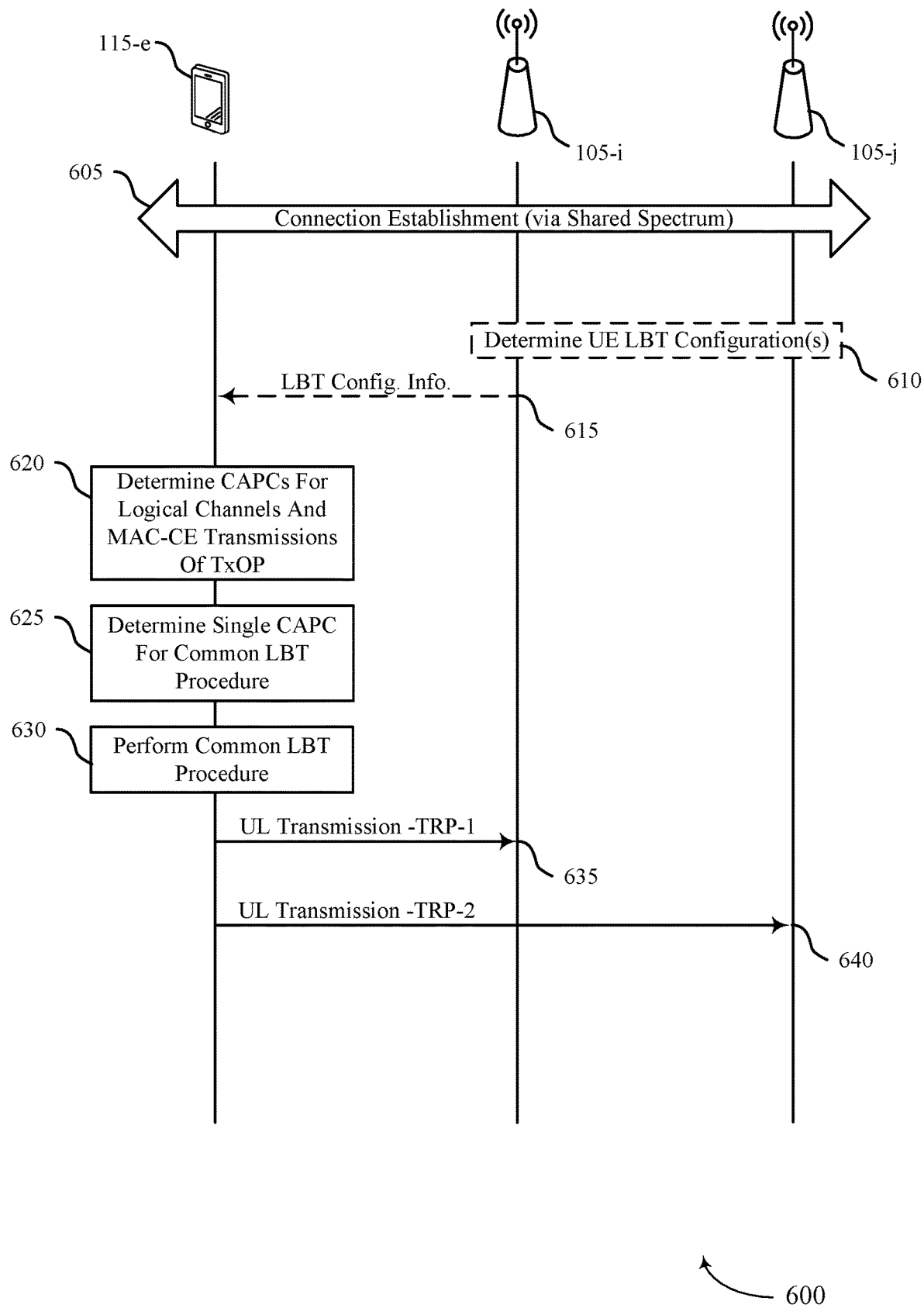

FIG. 6 illustrates an example of a process flow 600 that supports uplink reporting techniques for multi transmission-reception point transmissions in accordance with aspects of the present disclosure. The process flow 600 may include a UE 115-*e*, a first TRP 105-*i*, and a second TRP 105-*j*, which may be examples of the corresponding devices described with reference to FIGS. 1 through 5. TRPs 105 and UE 115-*e* may implement one or more techniques for uplink reporting as discussed herein. Alternative examples of the following may be implemented, where some steps are performed in a different order than described or are not performed at all. In some cases, steps may include additional features not mentioned below, or further steps may be added.

At 605, the UE 115-*e*, the first TRP 105-*i*, and the second TRP 105-*j* may establish wireless connections. Such wireless connections may be established in accordance with connection establishment techniques of a wireless network (e.g., a NR network), such as through RRC configuration of connections. The wireless connections may support multiple concurrent connections between the UE 115-*e* and the first TRP 105-*i* and second TRP 105-*j*. The multiple connections may provide concurrent downlink transmissions, concurrent uplink transmissions, or combinations thereof. In this example, the connections may use shared radio frequency spectrum that uses contention-based access techniques for channel access by a device seeking to transmit.

Optionally, at 610, the first TRP 105-*i* and the second TRP 105-*j* may determine LBT configurations for UE 115-*e*. In some cases, the LBT configurations may be identified based on a capability of the UE 115-*e* to support multiple concurrent uplink transmissions, and a common LBT procedure for uplink transmission to both TRPs 105 may be configured when the UE 115-*e* may support such concurrent uplink transmissions. In other cases, such as discussed with reference to FIG. 7, independent LBT procedures may be configured for each TRP. The first TRP 105-*i*, at 615, may transmit the LBT configuration information to the UE 115-*e*. In some cases, the configuration information includes information for CAPCs to use in determining one or more LBT parameters.

At 620, the UE 115-*e* may determine CAPCs for logical channels and MAC-CE transmissions of a TxOP. In some cases, CAPCs may be determined form each logical channel for transmissions to each TRP 105. Further, the UE 115-*e* may determine if any of the uplink transmissions include a MAC CE and, in cases where a MAC CE is present, whether it is a BSR padding MAC CE.

At 625, the UE 115-*e* may determine a single CAPC to be used for a common LBT procedure for channel access and uplink transmissions to each of the TRPs 105. In some cases, the single CAPC may be determined as a lowest CAPC of the identified logical channels when no MAC CE is present, or when only BSR padding MAC CEs are present. In cases where a MAC CE is present, that is not a BSR padding MAC CE, the UE 115-*e* may determine the signal CAPC as a highest CAPC (thus providing a highest likelihood of a successful LBT procedure).

At 630, the UE 115-*e* may perform the common LBT procedure, based on the determined single CAPC. In the event that the common LBT procedure fails to obtain channel access for the UE 115-*e*, a backoff counter and contention window may be adjusted in accordance with the single CAPC, and the LBT procedure attempted again based on the LBT parameters. In the event that the common LBT procedure is successful, the UE 115-*e* may, at 635, transmit a first uplink transmission to the first TRP 105-*i*, and may, at 640, transmit a second concurrent uplink transmission to the second TRP 105-*j*.

The operations performed by the TRPs 105 and the UE 115-*e* as part of, but not limited to, process flow 600 may provide improvements to UE 115-*e* LBT procedures when using shared spectrum. For example, the described LBT procedures in the process flow 600 may support reduced power consumption, and enhanced resource utilization, among other advantages. Such techniques may allow for reduced power consumption through a common LBT procedure among multiple TRPs 105 in which two or more concurrent uplink transmissions may be provided to different TRPs 105. Additionally, such concurrent transmissions may enhance the reliability and capacity of a system.

Figure 7:
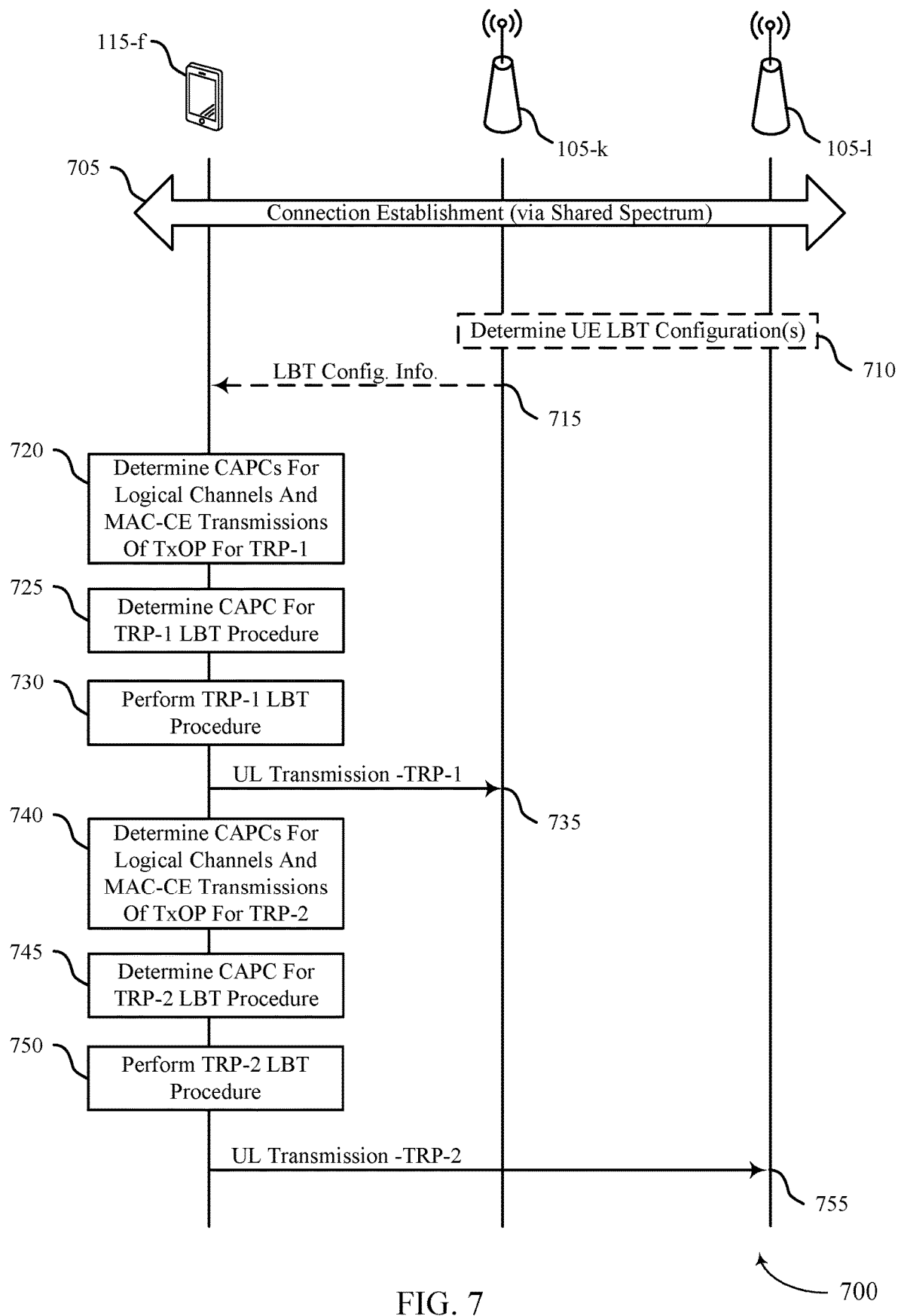

FIG. 7 illustrates an example of a process flow 700 that supports uplink reporting techniques for multi transmission-reception point transmissions in accordance with aspects of the present disclosure. The process flow 700 may include a UE 115-*f*, a first TRP 105-*k*, and a second TRP 105-*l*, which may be examples of the corresponding devices described with reference to FIGS. 1 through 5. TRPs 105 and UE 115-*f* may implement one or more techniques for uplink reporting as discussed herein. Alternative examples of the following may be implemented, where some steps are performed in a different order than described or are not performed at all. In some cases, steps may include additional features not mentioned below, or further steps may be added.

At 705, the UE 115-*f*, the first TRP 105-*k*, and the second TRP 105-*l* may establish wireless connections. Such wireless connections may be established in accordance with connection establishment techniques of a wireless network (e.g., a NR network), such as through RRC configuration of connections. The wireless connections may support multiple concurrent connections between the UE 115-*f* and the first TRP 105-*k* and second TRP 105-*l*. The multiple connections may provide concurrent downlink transmissions, concurrent uplink transmissions, or combinations thereof. In this example, the connections may use shared radio frequency spectrum that uses contention-based access techniques for channel access by a device seeking to transmit.

Optionally, at 710, the first TRP 105-*k* and the second TRP 105-*l* may determine LBT configurations for UE 115-*f*. In some cases, the LBT configurations may be identified based on a capability of the UE 115-*f* to support multiple concurrent uplink transmissions, and independent and separate LBT procedures for uplink transmissions to both TRPs 105 may be configured when the UE 115-*f* may support such concurrent or non-concurrent uplink transmissions. In some cases, such as discussed with respect to FIG. 6, the LBT configurations may provide for a common LBT. In this example, the first TRP 105-*k*, at 715, may transmit the LBT configuration information to the UE 115-*f*. In some cases, the configuration information includes information for CAPCs to use in determining one or more LBT parameters.

At 720, the UE 115-*f* may determine CAPCs for logical channels and MAC-CE transmissions of a TxOP for the first TRP 105-*k*. In some cases, CAPCs may be determined form each logical channel for an uplink transmission to the first TRP 105-*k*. Further, the UE 115-*f* may determine the uplink transmission includes a MAC CE and, in cases where a MAC CE is present, whether it is a BSR padding MAC CE.

At 725, the UE 115-*f* may determine a CAPC to be used for a first TRP 105-*k* LBT procedure for channel access and uplink transmission to the first TRP 105-*k*. In some cases, the CAPC may be determined as a lowest CAPC of the identified logical channels when no MAC CE is present, or when only BSR padding MAC CEs are present. In cases where a MAC CE is present, that is not a BSR padding MAC CE, the UE 115-*f* may determine the CAPC as a highest CAPC (thus providing a highest likelihood of a successful LBT procedure).

At 730, the UE 115-*f* may perform the LBT procedure for the first TRP 105-*k* transmission, based on the determined CAPC. In the event that the LBT procedure fails to obtain channel access for the UE 115-*f*, a backoff counter and contention window may be adjusted in accordance with the CAPC, and the LBT procedure attempted again based on the LBT parameters. In the event that the LBT procedure is successful, the UE 115-*f* may, at 735, transmit a first uplink transmission to the first TRP 105-*k*.

At 740, the UE 115-*f* may determine CAPCs for logical channels and MAC-CE transmissions of a TxOP for the second TRP 105-*l*. In some cases, CAPCs may be determined form each logical channel for an uplink transmission to the second TRP 105-*l*. Further, the UE 115-*f* may determine the uplink transmission includes a MAC CE and, in cases where a MAC CE is present, whether it is a BSR padding MAC CE.

At 745, the UE 115-*f* may determine a CAPC to be used for a second TRP 105-*l* LBT procedure for channel access and uplink transmission to the second TRP 105-*l*. In some cases, the CAPC may be determined as a lowest CAPC of the identified logical channels when no MAC CE is present, or when only BSR padding MAC CEs are present. In cases where a MAC CE is present, that is not a BSR padding MAC CE, the UE 115-*f* may determine the CAPC as a highest CAPC (thus providing a highest likelihood of a successful LBT procedure).

At 750, the UE 115-*f* may perform the LBT procedure for the second TRP 105-*l* transmission, based on the determined CAPC. In the event that the LBT procedure fails to obtain channel access for the UE 115-*f*, a backoff counter and contention window may be adjusted in accordance with the CAPC, and the LBT procedure attempted again based on the LBT parameters. In the event that the LBT procedure is successful, the UE 115-*f* may, at 755, transmit a second uplink transmission to the second TRP 105-*l*.

The operations performed by the TRPs 105 and the UE 115-*f* as part of, but not limited to, process flow 700 may provide improvements to UE 115-*f* LBT procedures when using shared spectrum. For example, the described LBT procedures in the process flow 600 may support efficient spectrum access through independent CAPC determination for different TRPs 105, among other advantages. Such techniques may allow for enhanced reliability of communications of certain logical channels, which may enhance the reliability and capacity of a system.

Figure 8:
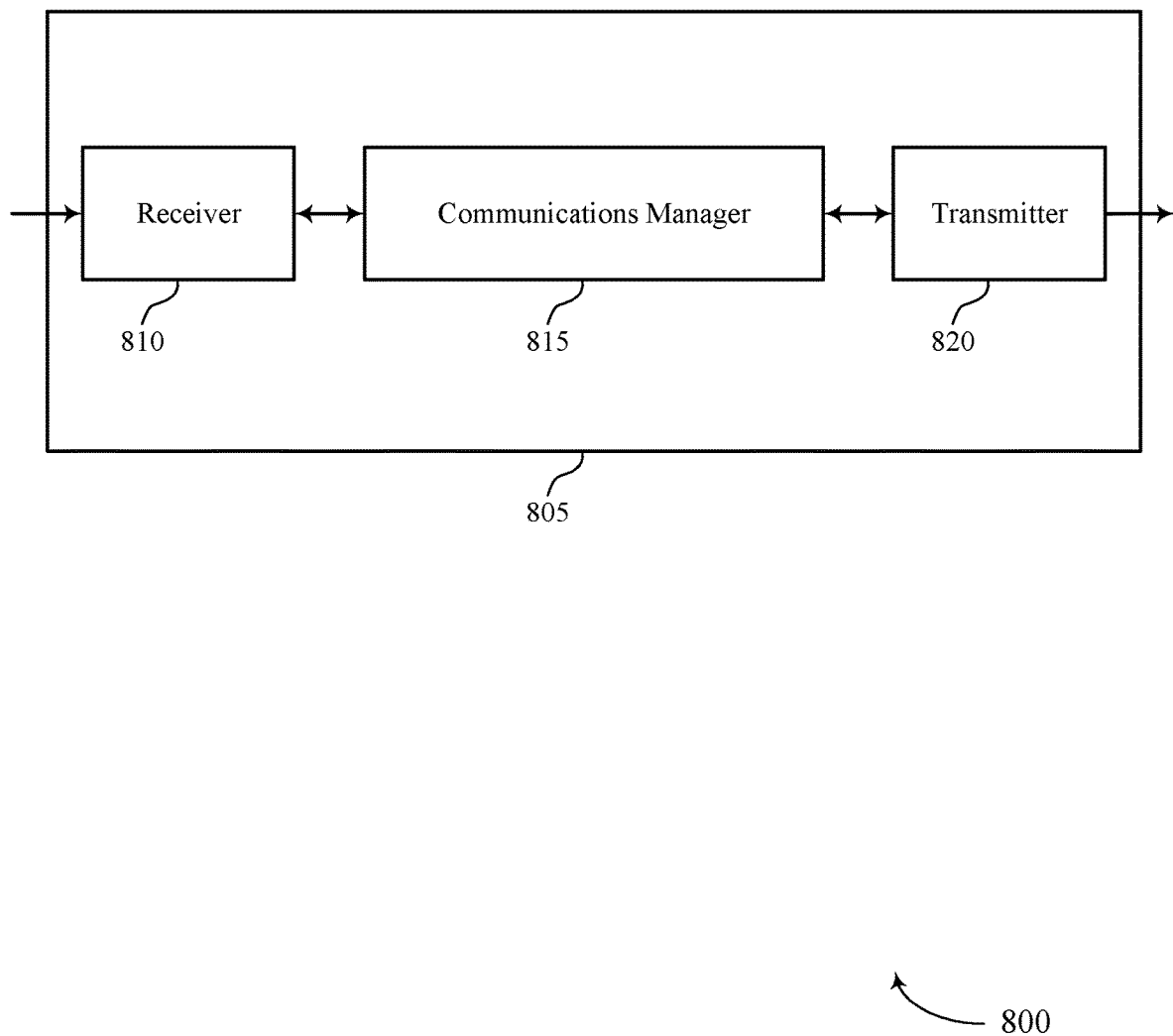
FIGS. 8 and 9 show block diagrams of devices that support uplink reporting techniques for multi transmission-reception point transmissions in accordance with aspects of the present disclosure.

FIG. 8 shows a block diagram 800 of a device 805 that supports uplink reporting techniques for multi transmission-reception point transmissions in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to uplink reporting techniques for multi transmission-reception point transmissions, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may establish wireless connections with a set of transmission-reception points (TRPs), identify a first reporting configuration of a set of reporting configurations for the UE to use to transmit reporting information to the set of TRPs, determine, based on the first reporting configuration, one or more TRPs of the set of TRPs to which to transmit the reporting information, and transmit the reporting information to the determined one or more TRPs according to the identified first reporting configuration.

The communications manager 815 may also establish wireless connections with a set of transmission-reception points (TRPs) on a shared radio frequency spectrum band, identify one or more logical channel transmissions, or one or more medium access control (MAC) control elements (CEs), or a combination thereof, that are to be transmitted to the set of TRPs, identify a channel access priority class (CAPC) associated with each of the logical channel transmissions, or the one or more MAC CEs, or the combination thereof, determine, based on the identified CAPCs, a single CAPC to use in a common LBT procedure to initiate transmissions to the set of TRPs, and perform the common LBT procedure, based on the determined single CAPC, to access the shared radio frequency spectrum band. The communications manager 815 may be an example of aspects of the communications manager 1110 described herein.

The communications manager 815 as described herein may be implemented to realize one or more potential advantages. One implementation may allow the device 805 to save power and increase battery life by communicating with one or more TRPs more efficiently. For example, the device 805 may provide reporting information to one TRP in some cases (e.g., when multiple TRPs have an ideal backhaul connection), or to multiple TRPs on other cases (e.g., when multiple TRPs have a non-ideal backhaul connection). Further, in cases that use shared spectrum, channel access parameters may be efficiently determined, and used for contention-based channel access to TRPs.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
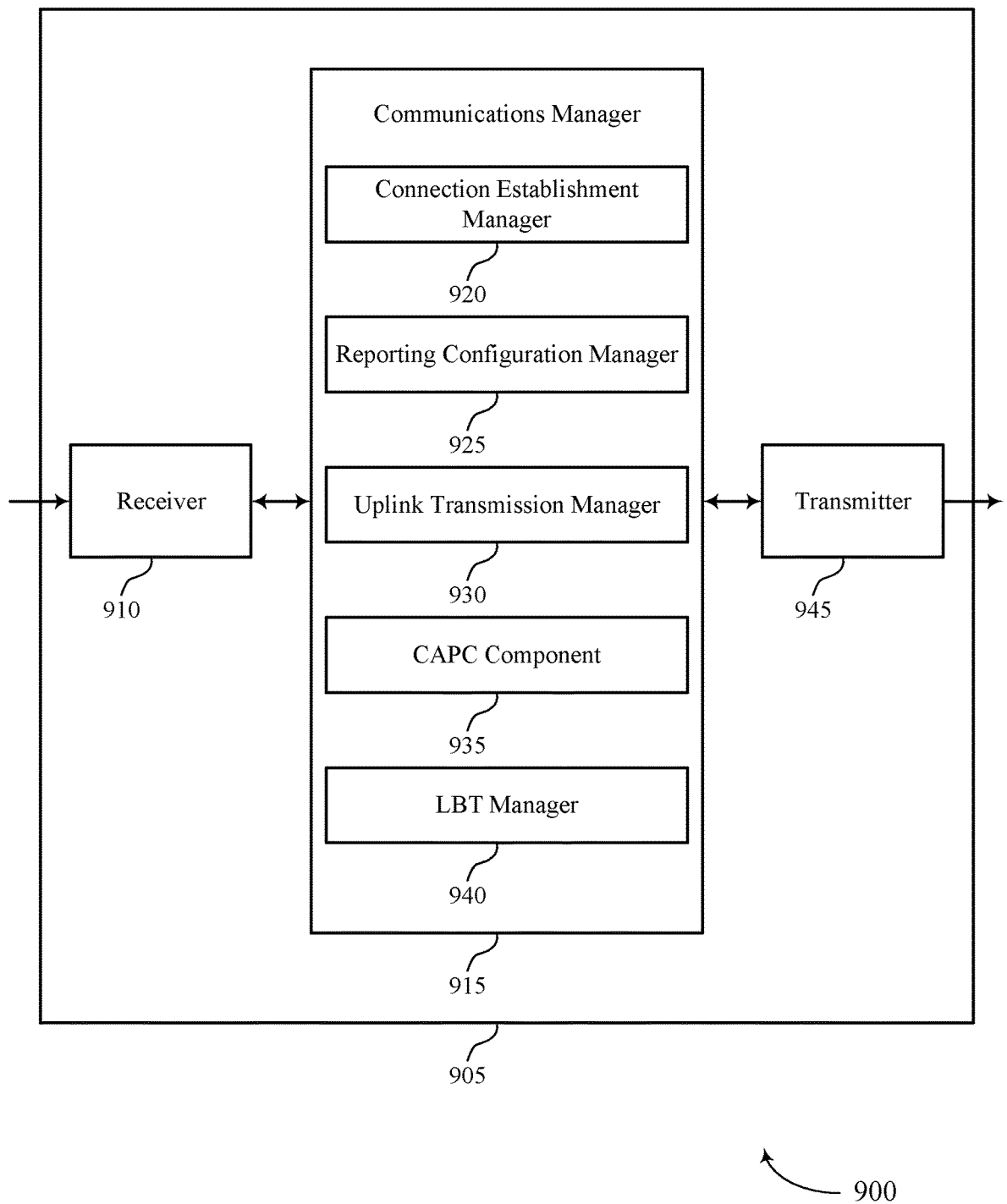

FIG. 9 shows a block diagram 900 of a device 905 that supports uplink reporting techniques for multi transmission-reception point transmissions in accordance with aspects of the present disclosure. The device 905 may be an example of aspects of a device 805, or a UE 115 as described herein. The device 905 may include a receiver 910, a communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to uplink reporting techniques for multi transmission-reception point transmissions, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a connection establishment manager 920, a reporting configuration manager 925, an uplink transmission manager 930, a CAPC component 935, and an LBT manager 940. The communications manager 915 may be an example of aspects of the communications manager 1110 described herein.

The connection establishment manager 920 may establish wireless connections with a set of transmission-reception points (TRPs). In some cases, the connection establishment manager 920 may establish wireless connections on a shared radio frequency spectrum band.

The reporting configuration manager 925 may identify a first reporting configuration of a set of reporting configurations for the UE to use to transmit reporting information to the set of TRPs and determine, based on the first reporting configuration, one or more TRPs of the set of TRPs to which to transmit the reporting information.

The uplink transmission manager 930 may transmit the reporting information to the determined one or more TRPs according to the identified first reporting configuration. In some cases that use shared radio frequency spectrum, the uplink transmission manager 930 may identify one or more logical channel transmissions, or one or more medium access control (MAC) control elements (CEs), or a combination thereof, that are to be transmitted to the set of TRPs.

The CAPC component 935, in cases that use shared radio frequency spectrum, may identify a CAPC associated with each of the logical channel transmissions, or the one or more MAC CEs, or the combination thereof. The LBT manager 940 may determine, based on the identified CAPCs, a single CAPC to use in a common LBT procedure to initiate transmissions to the set of TRPs and perform the common LBT procedure, based on the determined single CAPC, to access the shared radio frequency spectrum band.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
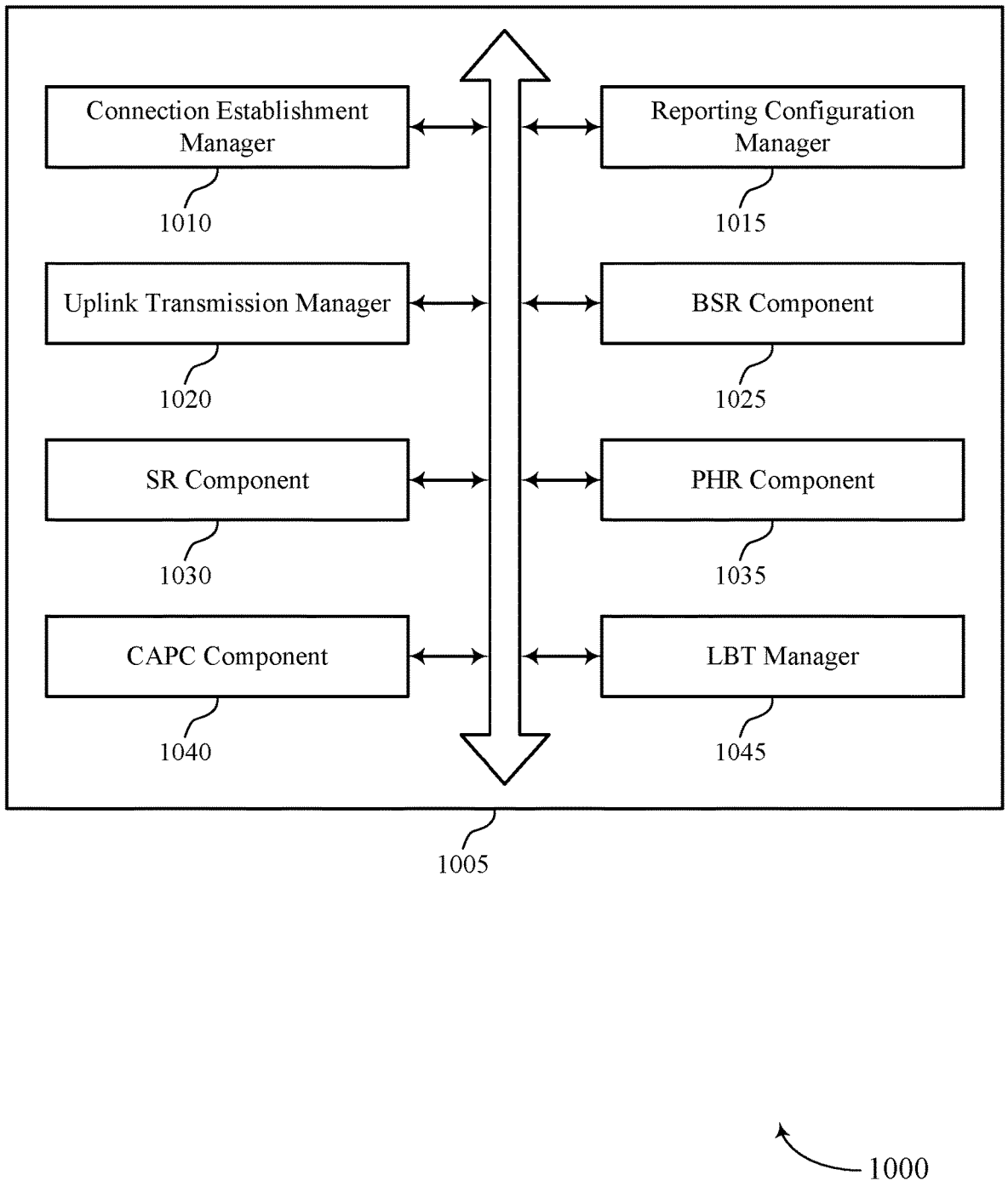
FIG. 10 shows a block diagram of a communications manager that supports uplink reporting techniques for multi transmission-reception point transmissions in accordance with aspects of the present disclosure.

FIG. 10 shows a block diagram 1000 of a communications manager 1005 that supports uplink reporting techniques for multi transmission-reception point transmissions in accordance with aspects of the present disclosure. The communications manager 1005 may be an example of aspects of a communications manager 815, a communications manager 915, or a communications manager 1110 described herein. The communications manager 1005 may include a connection establishment manager 1010, a reporting configuration manager 1015, an uplink transmission manager 1020, a BSR component 1025, a SR component 1030, a PHR component 1035, a CAPC component 1040, and an LBT manager 1045. Each of these modules may communicate, directly or indirectly, with one another (e.g., via one or more buses).

The connection establishment manager 1010 may establish wireless connections with a set of transmission-reception points (TRPs). In some examples, the connection establishment manager 1010 may establish wireless connections with a set of TRPs on a shared radio frequency spectrum band.

The reporting configuration manager 1015 may identify a first reporting configuration of a set of reporting configurations for the UE to use to transmit reporting information to the set of TRPs. In some examples, the reporting configuration manager 1015 may determine, based on the first reporting configuration, one or more TRPs of the set of TRPs to which to transmit the reporting information. In some examples, the reporting configuration manager 1015 may receive an uplink grant from a first TRP of the set of TRPs, reporting information, such as a BSR, may be transmitted to the first TRP.

In some examples, the reporting configuration manager 1015 may receive a first uplink grant for a first uplink transmission to a first TRP of the set of TRPs and a second uplink grant for a second uplink transmission to a second TRP of the set of TRPs, the first uplink transmission concurrent at least in part with the second uplink transmission, and may select, based on the first reporting configuration, the first TRP or the second TRP to receive reporting information such as the BSR. In some cases, the first TRP or the second TRP is selected to receive reporting information based on an amount of uplink resources allocated in each uplink grant, or channel conditions between the UE and the first TRP, or channel conditions between the UE and the second TRP, or a modulation and coding scheme (MCS) of each uplink grant, or a combination thereof.

In some examples, the reporting configuration manager 1015 may determine to transmit a second BSR to a second TRP of the set of TRPs according to a second reporting configuration of the set of reporting configurations. In some examples, the reporting configuration manager 1015 may receive, from at least one of the set of TRPs, configuration information indicating at least one of the set of reporting configurations for transmitting the reporting information. In some cases, the set of reporting configurations include separate BSR configurations provided for each of the first TRP and the second TRP that are to be used by the UE for transmission of the corresponding BSR to the corresponding TRP.

The uplink transmission manager 1020 may transmit the reporting information to the determined one or more TRPs according to the identified reporting configuration.

In some examples, the uplink transmission manager 1020 may identify one or more logical channel transmissions, or one or more medium access control (MAC) control elements (CEs), or a combination thereof, that are to be transmitted to the set of TRPs.

The CAPC component 1040 may identify a CAPC associated with each of the logical channel transmissions, or the one or more MAC CEs, or the combination thereof. In some examples, the CAPC component 1040 may determine that only logical channel transmissions are to be transmitted to each of the set of TRPs during a transmission opportunity associated with the LBT procedure. In some examples, the CAPC component 1040 may determine a lowest CAPC associated with each of the logical channel transmissions as the single CAPC for use in the common LBT procedure. In some examples, the CAPC component 1040 may determine that a MAC CE is to be transmitted to at least one of the set of TRPs during a transmission opportunity associated with the LBT procedure. In some examples, the CAPC component 1040 may determine a highest available CAPC as the same CAPC for use in the common LBT procedure. In some examples, the CAPC component 1040 may determine that the MAC CE is different than a padding buffer status report (BSR) MAC CE.

The LBT manager 1045 may determine, based on the identified CAPCs, a single CAPC to use in a common LBT procedure to initiate transmissions to the set of TRPs. In some examples, the LBT manager 1045 may perform the common LBT procedure, based on the determined single CAPC, to access the shared radio frequency spectrum band. In some examples, the LBT manager 1045 may determine, based on the determined single CAPC, one or more LBT parameters for the LBT procedure.

In some examples, the LBT manager 1045 may receive configuration information for performing the common LBT procedure, the configuration information indicating a first LBT configuration of set of available LBT configurations, where the first LBT configuration provides that the single CAPC is to be used in the common LBT procedure, and where a second LBT configuration of the set of available LBT configurations provides that independent CAPCs associated with each of the set of TRPs are to be used in independent LBT procedures to separately initiate transmissions to each of the set of TRPs.

The BSR component 1025 may determine a current buffer status of the UE. In some examples, the BSR component 1025 may identify a ratio of data transmitted to a first TRP of the set of TRPs relative to a total amount of data transmitted to each of the set of TRPs. In some examples, the BSR component 1025 may adjust the current buffer status of the UE based on the identified ratio to obtain a first adjusted buffer status. In some examples, the BSR component 1025 may report the first adjusted buffer status to the first TRP. In some examples, the BSR component 1025 may estimate the ratio based on past amounts of data transmitted to the first TRP relative to the total amount of data transmitted to each of the set of TRPs. In some cases, the ratio is provided in the first reporting configuration.

In some cases, the reporting information includes a buffer status report (BSR). In some cases, the BSR is a single BSR that is transmitted to a first TRP of the set of TRPs for use by two or more TRPs of the set of TRPs in scheduling uplink transmissions of the UE. In some cases, the first BSR is transmitted to the first TRP based on a first trigger from the first configuration, and the second BSR is transmitted to the second TRP based on a second trigger from the second configuration. In some cases, a buffer status reported in each of the first BSR and the second BSR is a current buffer status of the UE irrespective of uplink data transmissions to one or more other TRPs of the set of TRPs.

The SR component 1030 may transmit, prior to transmitting the reporting information, a first scheduling request (SR) to a first TRP of the one or more TRPs and one or more additional SRs to one or more other TRPs of the one or more TRPs. In some examples, the SR component 1030 may cancel the first SR responsive to the transmitting the reporting information to the first TRP. In some examples, the SR component 1030 may maintain the one or more additional SRs of the one or more other TRPs. In some examples, the SR component 1030 may determine, based on the first reporting configuration, to transmit the SR to only a first TRP of the set of TRPs or to multiple TRPs of the set of TRPs.

The PHR component 1035 may format a PHR for transmission in the reporting information. In some cases, the PHR is a joint PHR that includes separate power headroom information for uplink transmission to each of the set of TRPs. In some cases, the joint PHR is based on a received transmission associated with an uplink grant received from a first TRP of the set of TRPs and a reference transmission associated with at least one other of the set of TRPs. In some cases, the reference transmission associated with the at least one other of the set of TRPs is used for the PHR based on whether an uplink grant is received from an associated TRP of the one or more other TRPs subsequent to a trigger that initiates the PHR. In some cases, the PHR includes power headroom information for a first TRP of the set of TRPs, and one or more other PHRs that include power headroom information for one or more other TRPs of the set of TRPs are separately transmitted based on independent PHR procedures at each of the one or more other TRPs.

Figure 11:
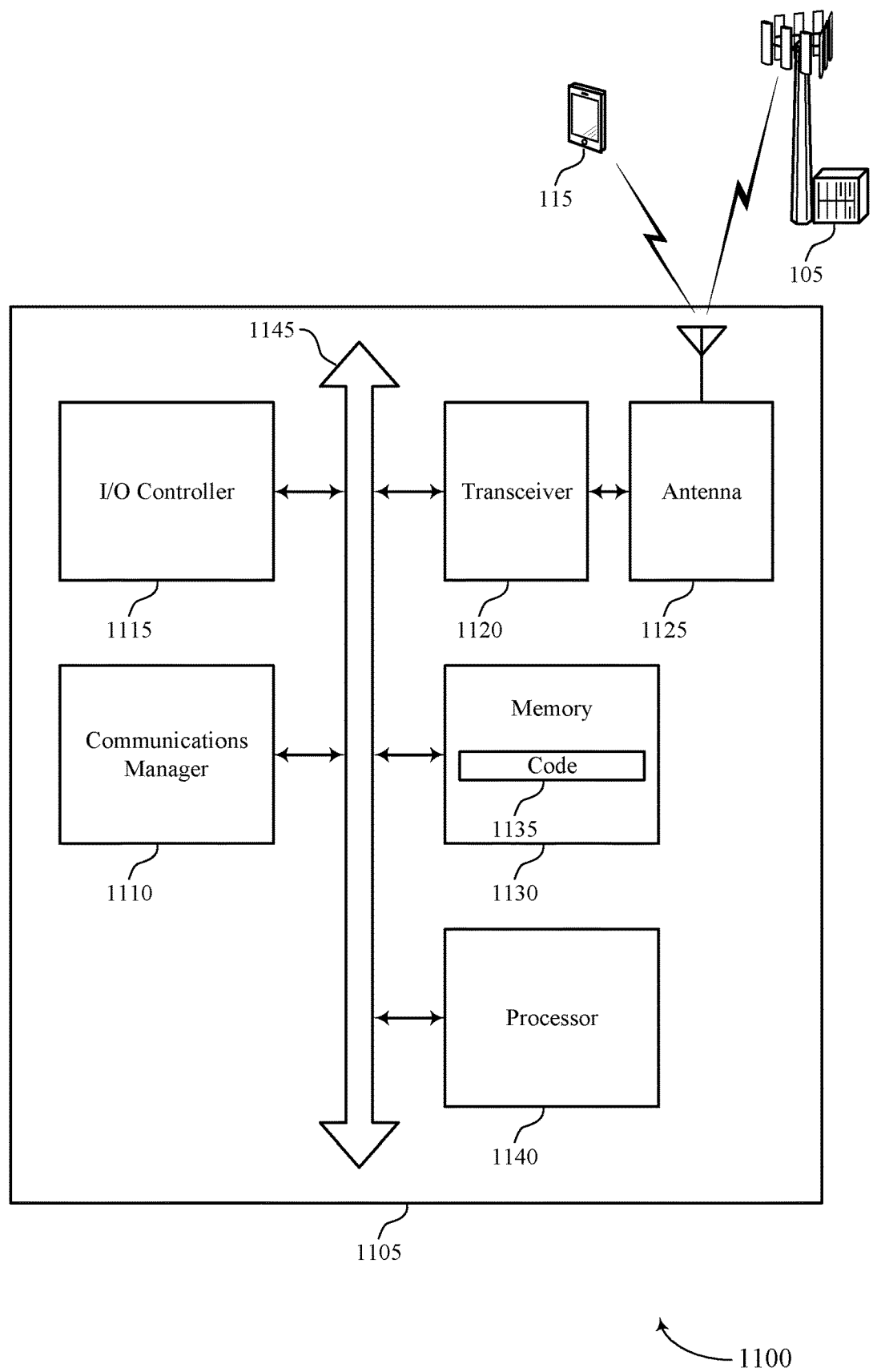
FIG. 11 shows a diagram of a system including a device that supports uplink reporting techniques for multi transmission-reception point transmissions in accordance with aspects of the present disclosure.

FIG. 11 shows a diagram of a system 1100 including a device 1105 that supports uplink reporting techniques for multi transmission-reception point transmissions in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may establish wireless connections with a set of transmission-reception points (TRPs), identify a first reporting configuration of a set of reporting configurations for the UE to use to transmit reporting information to the set of TRPs, determine, based on the first reporting configuration, one or more TRPs of the set of TRPs to which to transmit the reporting information, and transmit the reporting information to the determined one or more TRPs according to the identified first reporting configuration.

The communications manager 1110 may also establish wireless connections with a set of transmission-reception points (TRPs) on a shared radio frequency spectrum band, identify one or more logical channel transmissions, or one or more medium access control (MAC) control elements (CEs), or a combination thereof, that are to be transmitted to the set of TRPs, identify a channel access priority class (CAPC) associated with each of the logical channel transmissions, or the one or more MAC CEs, or the combination thereof, determine, based on the identified CAPCs, a single CAPC to use in a common LBT procedure to initiate transmissions to the set of TRPs, and perform the common LBT procedure, based on the determined single CAPC, to access the shared radio frequency spectrum band.

The device 1105 as described herein may be implemented to realize one or more potential advantages. One implementation may allow the device 1105 to save power and increase battery life by communicating with one or more TRPs more efficiently. For example, the device 1105 may provide reporting information to one TRP in some cases (e.g., when multiple TRPs have an ideal backhaul connection), or to multiple TRPs on other cases (e.g., when multiple TRPs have a non-ideal backhaul connection). Further, in cases that use shared spectrum, channel access parameters may be efficiently determined, and used for contention-based channel access to TRPs.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting uplink reporting techniques for multi transmission-reception point transmissions).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
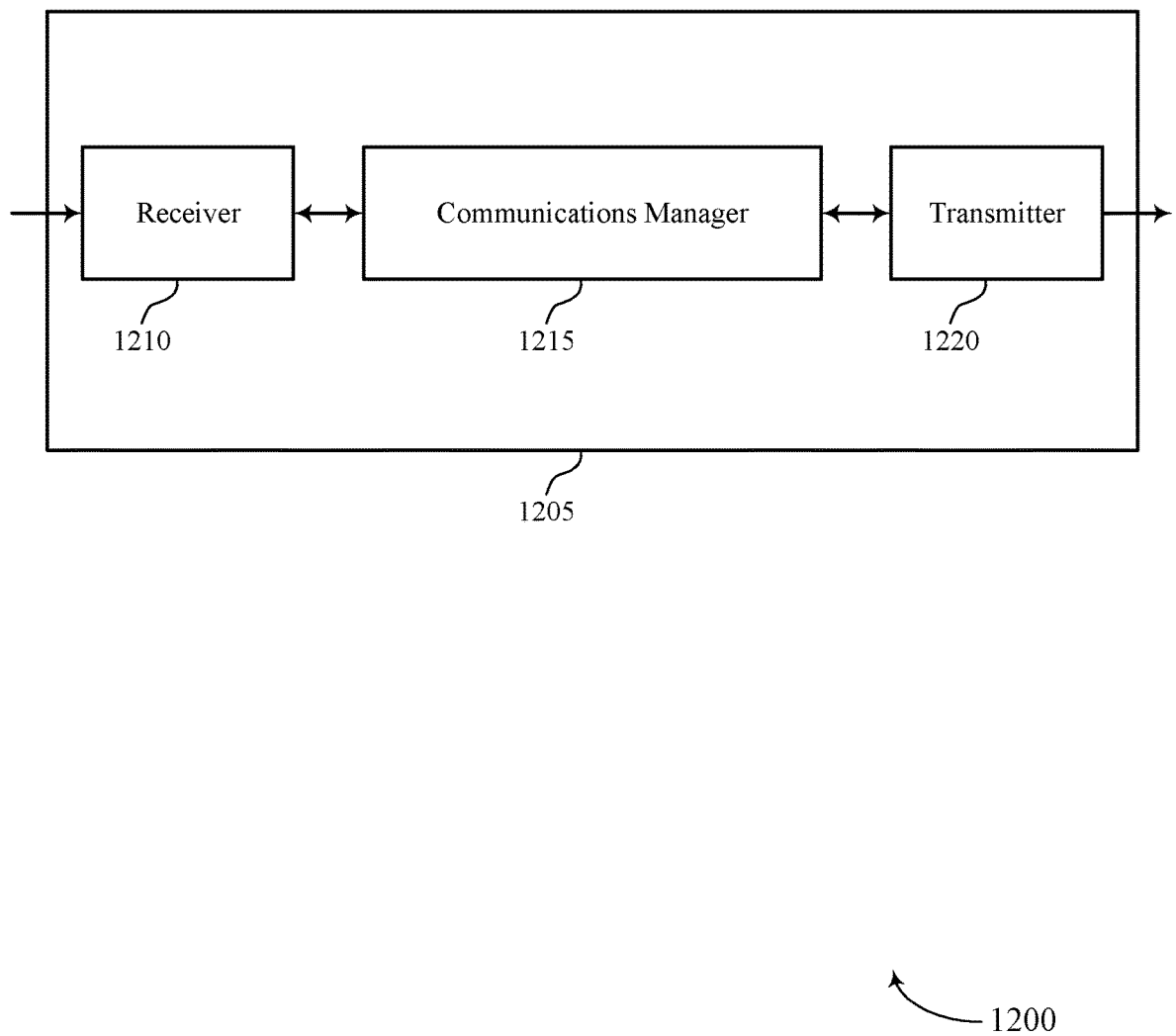
FIGS. 12 and 13 show block diagrams of devices that support uplink reporting techniques for multi transmission-reception point transmissions in accordance with aspects of the present disclosure.

FIG. 12 shows a block diagram 1200 of a device 1205 that supports uplink reporting techniques for multi transmission-reception point transmissions in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to uplink reporting techniques for multi transmission-reception point transmissions, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may establish a first wireless connection with a UE, identify that a second TRP of the set of TRPs has established a second wireless connection with the UE, transmit, to the UE, configuration information that indicates which of a set of available reporting configurations is to be used by the UE to transmit reporting information to at least one of the first TRP or the second TRP, and receive reporting information from the UE responsive at least in part to the transmitted configuration information. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
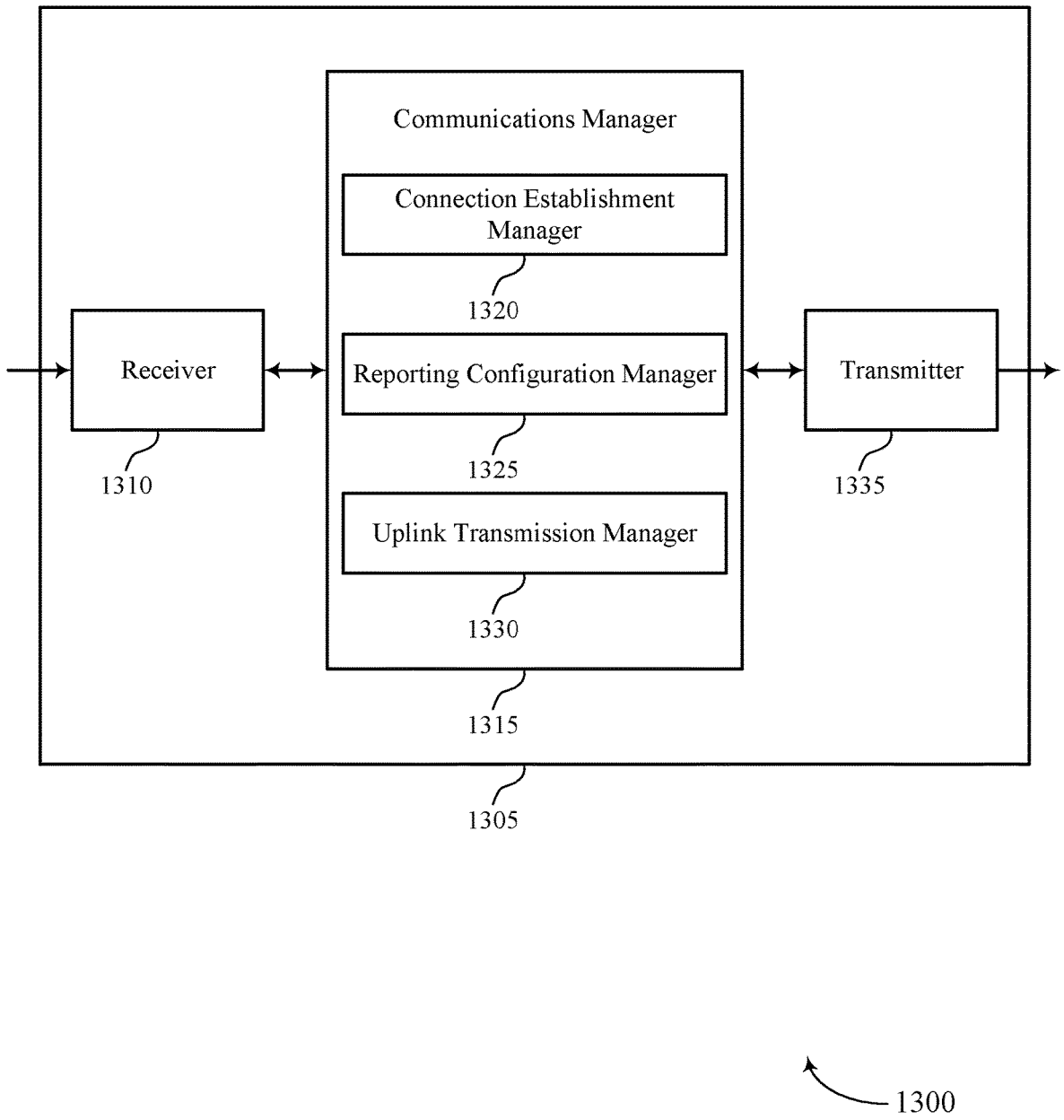

FIG. 13 shows a block diagram 1300 of a device 1305 that supports uplink reporting techniques for multi transmission-reception point transmissions in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to uplink reporting techniques for multi transmission-reception point transmissions, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a connection establishment manager 1320, a reporting configuration manager 1325, and an uplink transmission manager 1330. The communications manager 1315 may be an example of aspects of the communications manager 1510 described herein.

The connection establishment manager 1320 may establish a first wireless connection with a UE and identify that a second TRP of the set of TRPs has established a second wireless connection with the UE.

The reporting configuration manager 1325 may transmit, to the UE, configuration information that indicates which of a set of available reporting configurations is to be used by the UE to transmit reporting information to at least one of the first TRP or the second TRP.

The uplink transmission manager 1330 may receive reporting information from the UE responsive at least in part to the transmitted configuration information.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
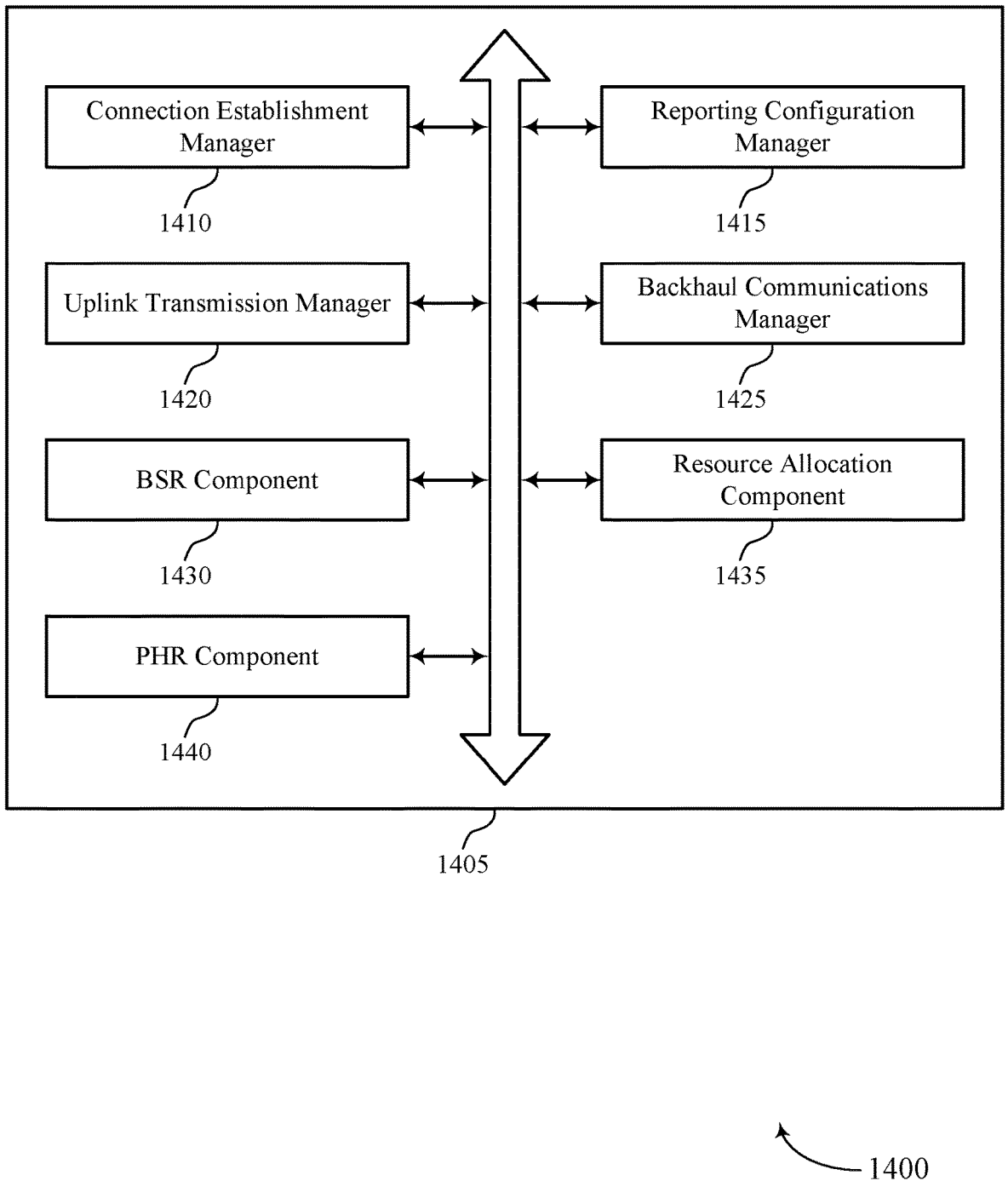
FIG. 14 shows a block diagram of a communications manager that supports uplink reporting techniques for multi transmission-reception point transmissions in accordance with aspects of the present disclosure.

FIG. 14 shows a block diagram 1400 of a communications manager 1405 that supports uplink reporting techniques for multi transmission-reception point transmissions in accordance with aspects of the present disclosure. The communications manager 1405 may be an example of aspects of a communications manager 1215, a communications manager 1315, or a communications manager 1510 described herein. The communications manager 1405 may include a connection establishment manager 1410, a reporting configuration manager 1415, an uplink transmission manager 1420, a backhaul communications manager 1425, a BSR component 1430, a resource allocation component 1435, and a PHR component 1440. Each of these modules may communicate, directly or indirectly, with one another (e.g., via one or more buses).

The connection establishment manager 1410 may establish a first wireless connection with a UE. In some examples, the connection establishment manager 1410 may identify that a second TRP of the set of TRPs has established a second wireless connection with the UE.

The reporting configuration manager 1415 may transmit, to the UE, configuration information that indicates which of a set of available reporting configurations is to be used by the UE to transmit reporting information to at least one of the first TRP or the second TRP. In some examples, the reporting configuration manager 1415 may determine that a first reporting configuration of the set of available reporting configurations is to be used by the UE based on the latency exceeding the threshold value, where the first reporting configuration provides separate reporting information transmissions for each of the first TRP and the second TRP. In some examples, the reporting configuration manager 1415 may format the configuration information to indicate the first reporting configuration.

In some examples, the reporting configuration manager 1415 may determine that a second reporting configuration of the set of available reporting configurations is to be used by the UE based on the latency being at or below the threshold value, where the second reporting configuration provides joint reporting information for both the first TRP and the second TRP. In some examples, the reporting configuration manager 1415 may format the configuration information to indicate the second reporting configuration. In some examples, the reporting configuration manager 1415 may transmit, to the UE, configuration information that includes the set of reporting configurations available for transmitting the reporting information.

The uplink transmission manager 1420 may receive reporting information from the UE responsive at least in part to the transmitted configuration information.

The backhaul communications manager 1425 may determine, responsive to identifying that the second TRP has established the second wireless connection with the UE, that a backhaul communications link between the first TRP and the second TRP has a latency that exceeds a threshold value. In some examples, the backhaul communications manager 1425 may determine, responsive to identifying that the second TRP has established the second wireless connection with the UE, that a backhaul communications link between the first TRP and the second TRP has a latency that is at or below a threshold value.

The BSR component 1430 may configure the UE to estimate the adjusted buffer status based on past amounts of data transmitted via the first TRP relative to the total amount of uplink data transmitted between the UE and the set of TRPs. In some examples, the BSR component 1430 may configure the UE with the ratio as part of a first reporting configuration provided to the UE by the first TRP.

In some cases, the reporting information includes a buffer status report (BSR). In some cases, the BSR indicates a current buffer status of the UE irrespective of any potential uplink transmissions between the UE and the second TRP. In some cases, the BSR provides an adjusted buffer status from a current buffer status of the UE based on a ratio of data transmitted to the first TRP relative to a total amount of uplink data transmitted between the UE and the set of TRPs.

The resource allocation component 1435 may transmit an uplink grant to the UE that provides at least an indication of which of the set of reporting configurations is to be used by the UE for the BSR.

The PHR component 1440 may identify PHR provided by a UE. In some cases, the PHR is a joint PHR that includes separate power headroom information for each of the first TRP and the second TRP, and where the first TRP provides power headroom information from the joint PHR to the second TRP via a backhaul link.

Figure 15:
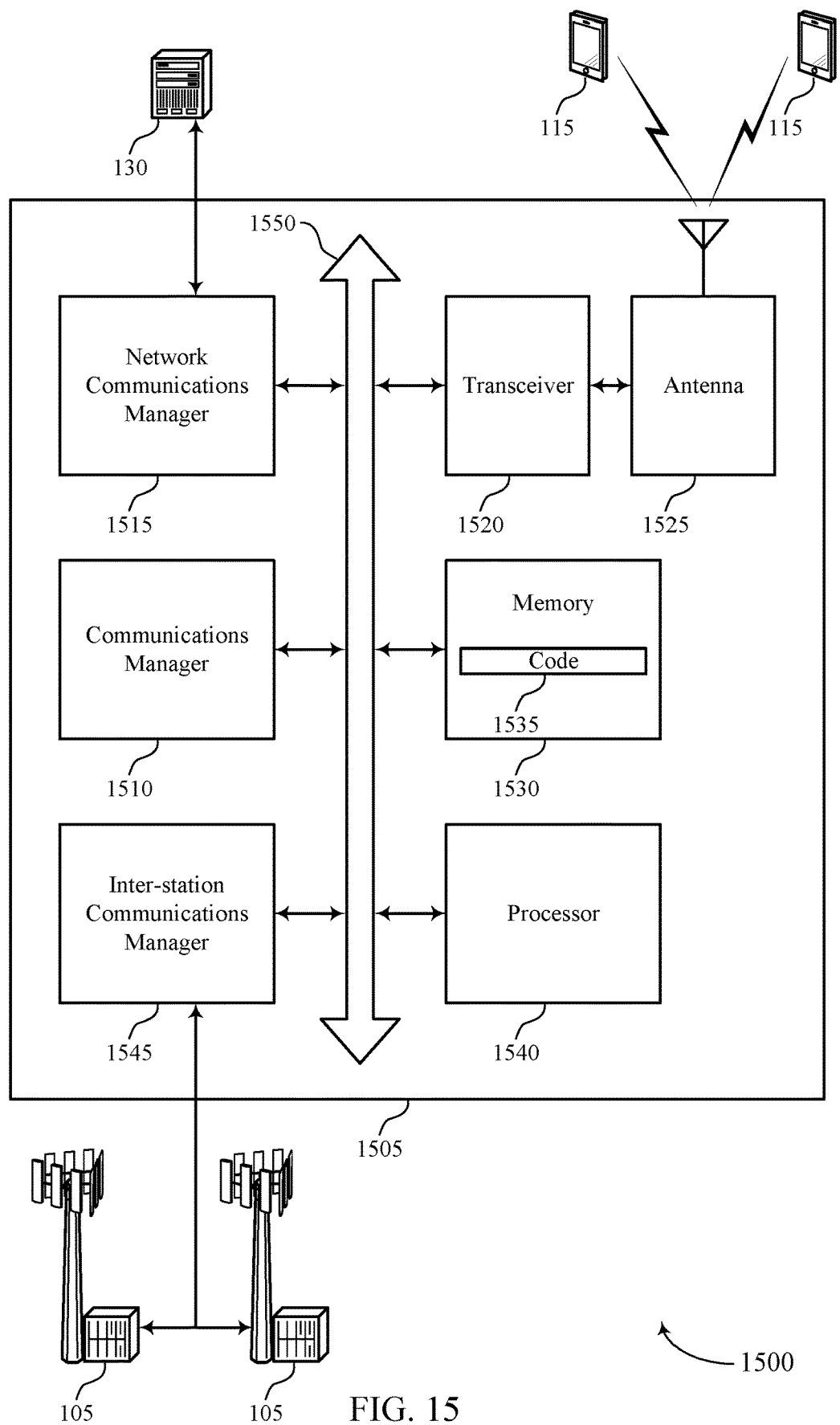
FIG. 15 shows a diagram of a system including a device that supports uplink reporting techniques for multi transmission-reception point transmissions in accordance with aspects of the present disclosure.

FIG. 15 shows a diagram of a system 1500 including a device 1505 that supports uplink reporting techniques for multi transmission-reception point transmissions in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may establish a first wireless connection with a UE, identify that a second TRP of the set of TRPs has established a second wireless connection with the UE, transmit, to the UE, configuration information that indicates which of a set of available reporting configurations is to be used by the UE to transmit reporting information to at least one of the first TRP or the second TRP, and receive reporting information from the UE responsive at least in part to the transmitted configuration information.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting uplink reporting techniques for multi transmission-reception point transmissions).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
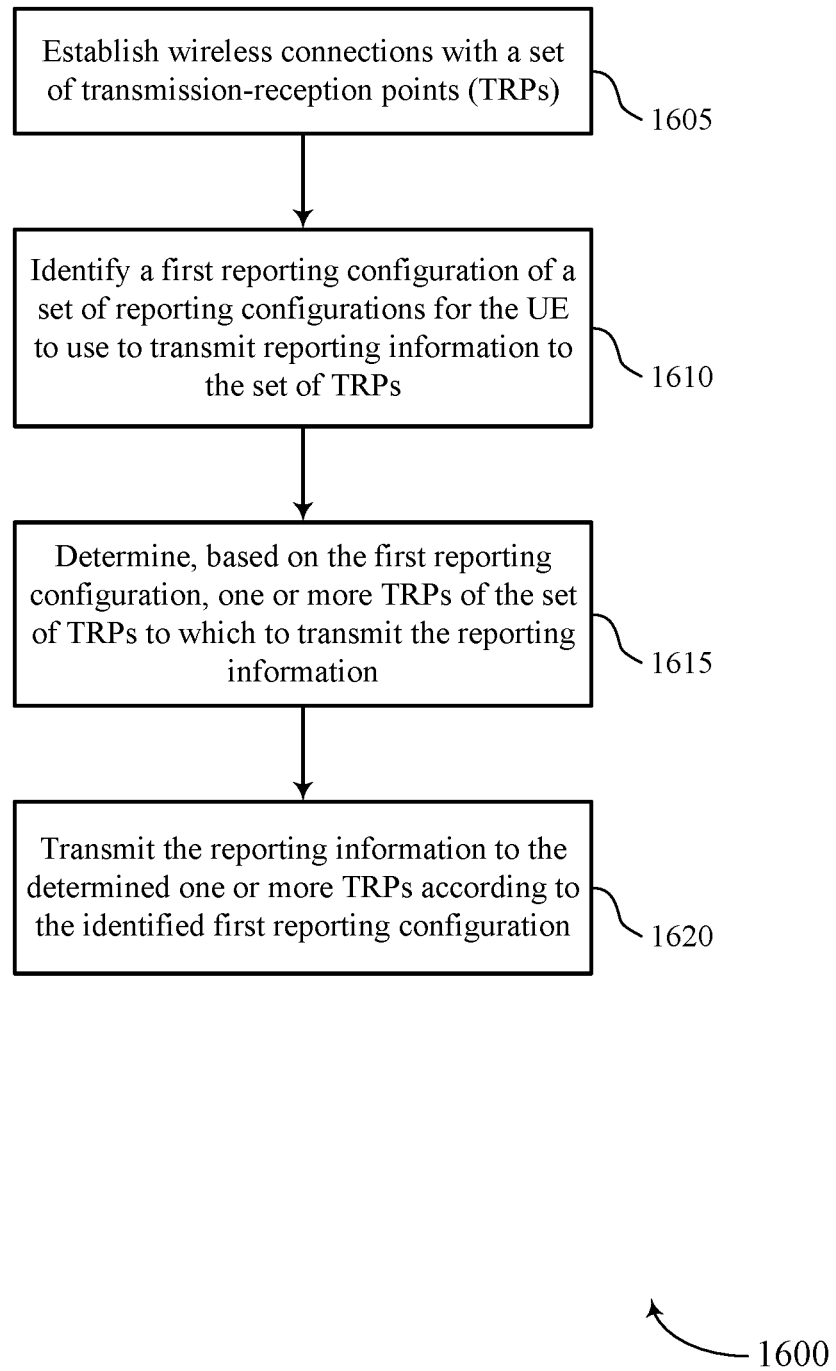
FIGS. 16 through 22 show flowcharts illustrating methods that support uplink reporting techniques for multi transmission-reception point transmissions in accordance with aspects of the present disclosure.

FIG. 16 shows a flowchart illustrating a method 1600 that supports uplink reporting techniques for multi transmission-reception point transmissions in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may establish wireless connections with a set of transmission-reception points (TRPs). The operations of 1605 may be performed according to the methods described herein. In some examples, aspects of the operations of 1605 may be performed by a connection establishment manager as described with reference to FIGS. 8 through 11.

At 1610, the UE may identify a first reporting configuration of a set of reporting configurations for the UE to use to transmit reporting information to the set of TRPs. The operations of 1610 may be performed according to the methods described herein. In some examples, aspects of the operations of 1610 may be performed by a reporting configuration manager as described with reference to FIGS. 8 through 11.

At 1615, the UE may determine, based on the first reporting configuration, one or more TRPs of the set of TRPs to which to transmit the reporting information. The operations of 1615 may be performed according to the methods described herein. In some examples, aspects of the operations of 1615 may be performed by a reporting configuration manager as described with reference to FIGS. 8 through 11.

At 1620, the UE may transmit the reporting information to the determined one or more TRPs according to the identified first reporting configuration. The operations of 1620 may be performed according to the methods described herein. In some examples, aspects of the operations of 1620 may be performed by an uplink transmission manager as described with reference to FIGS. 8 through 11.

Figure 17:
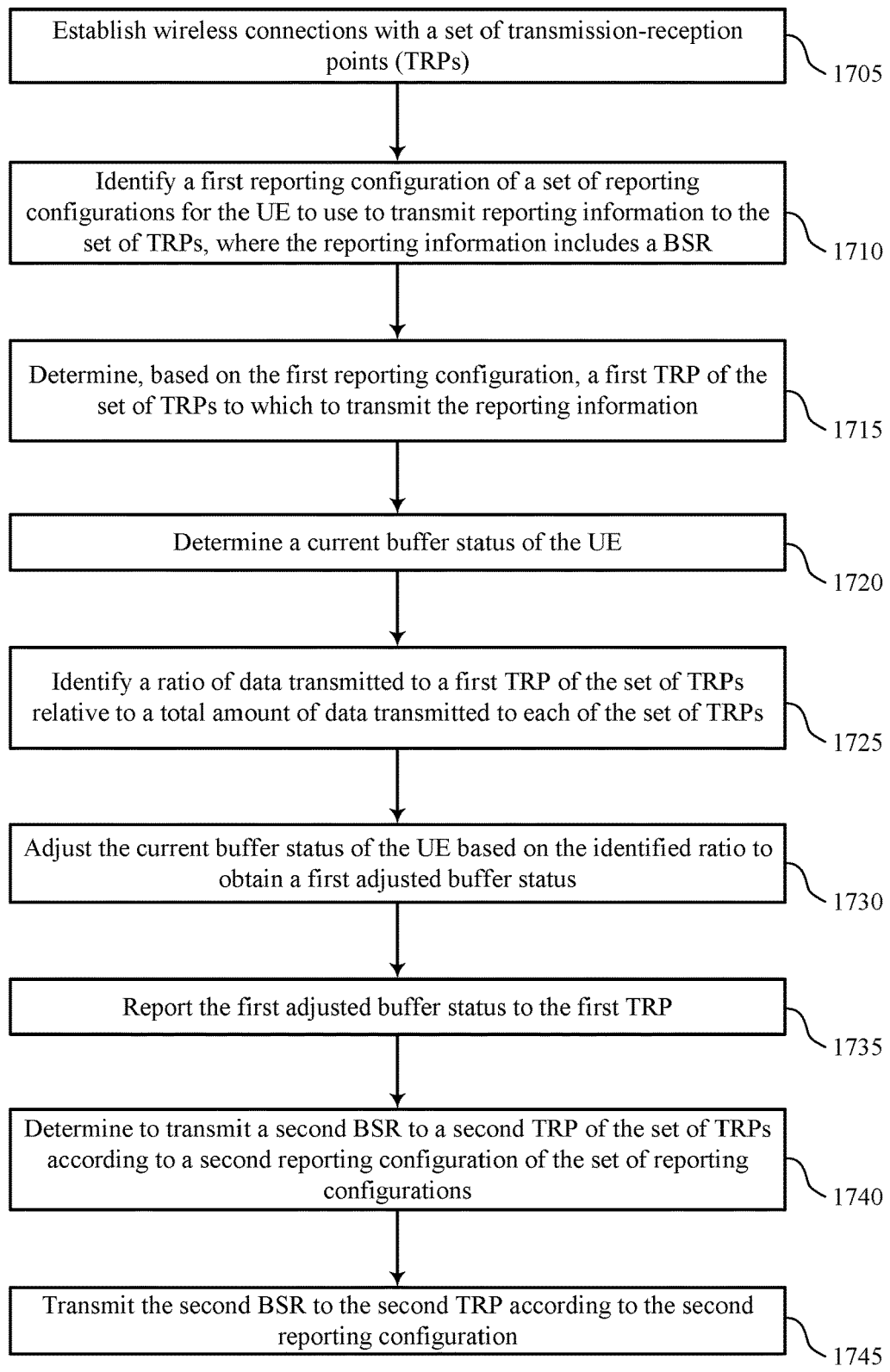

FIG. 17 shows a flowchart illustrating a method 1700 that supports uplink reporting techniques for multi transmission-reception point transmissions in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may establish wireless connections with a set of transmission-reception points (TRPs). The operations of 1705 may be performed according to the methods described herein. In some examples, aspects of the operations of 1705 may be performed by a connection establishment manager as described with reference to FIGS. 8 through 11.

At 1710, the UE may identify a first reporting configuration of a set of reporting configurations for the UE to use to transmit reporting information to the set of TRPs. The operations of 1710 may be performed according to the methods described herein. In some examples, aspects of the operations of 1710 may be performed by a reporting configuration manager as described with reference to FIGS. 8 through 11.

At 1715, the UE may determine, based on the first reporting configuration, one or more TRPs of the set of TRPs to which to transmit the reporting information. The operations of 1715 may be performed according to the methods described herein. In some examples, aspects of the operations of 1715 may be performed by a reporting configuration manager as described with reference to FIGS. 8 through 11.

At 1720, the UE may determine a current buffer status of the UE. The operations of 1720 may be performed according to the methods described herein. In some examples, aspects of the operations of 1720 may be performed by a BSR component as described with reference to FIGS. 8 through 11.

At 1725, the UE may identify a ratio of data transmitted to a first TRP of the set of TRPs relative to a total amount of data transmitted to each of the set of TRPs. The operations of 1725 may be performed according to the methods described herein. In some examples, aspects of the operations of 1725 may be performed by a BSR component as described with reference to FIGS. 8 through 11. In some cases, the UE may estimate the ratio based on past amounts of data transmitted to the first TRP relative to the total amount of data transmitted to each of the set of TRPs. In some cases, the ratio is provided in the first reporting configuration.

At 1730, the UE may adjust the current buffer status of the UE based on the identified ratio to obtain a first adjusted buffer status. The operations of 1730 may be performed according to the methods described herein. In some examples, aspects of the operations of 1730 may be performed by a BSR component as described with reference to FIGS. 8 through 11.

At 1735, the UE may report the first adjusted buffer status to the first TRP. The operations of 1735 may be performed according to the methods described herein. In some examples, aspects of the operations of 1735 may be performed by a BSR component as described with reference to FIGS. 8 through 11.

At 1740, the UE may determine to transmit a second BSR to a second TRP of the set of TRPs according to a second reporting configuration of the set of reporting configurations. The operations of 1740 may be performed according to the methods described herein. In some examples, aspects of the operations of 1740 may be performed by a reporting configuration manager as described with reference to FIGS. 8 through 11.

At 1745, the UE may transmit the second BSR to the second TRP according to the second reporting configuration. The operations of 1745 may be performed according to the methods described herein. In some examples, aspects of the operations of 1745 may be performed by a reporting configuration manager as described with reference to FIGS. 8 through 11.

Figure 18:
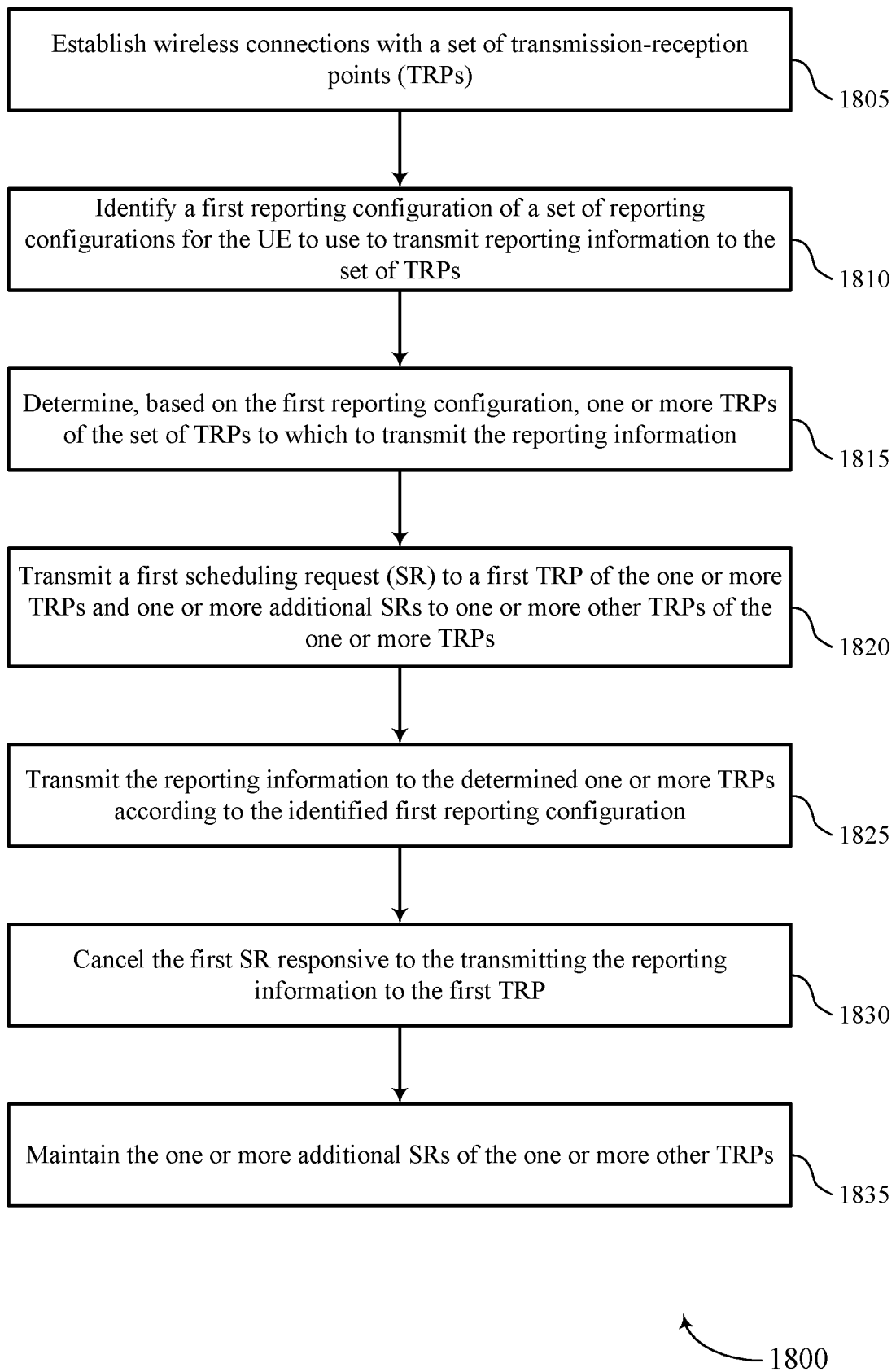

FIG. 18 shows a flowchart illustrating a method 1800 that supports uplink reporting techniques for multi transmission-reception point transmissions in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may establish wireless connections with a set of transmission-reception points (TRPs). The operations of 1805 may be performed according to the methods described herein. In some examples, aspects of the operations of 1805 may be performed by a connection establishment manager as described with reference to FIGS. 8 through 11.

At 1810, the UE may identify a first reporting configuration of a set of reporting configurations for the UE to use to transmit reporting information to the set of TRPs. The operations of 1810 may be performed according to the methods described herein. In some examples, aspects of the operations of 1810 may be performed by a reporting configuration manager as described with reference to FIGS. 8 through 11.

At 1815, the UE may determine, based on the first reporting configuration, one or more TRPs of the set of TRPs to which to transmit the reporting information. The operations of 1815 may be performed according to the methods described herein. In some examples, aspects of the operations of 1815 may be performed by a reporting configuration manager as described with reference to FIGS. 8 through 11.

At 1820, the UE may transmit, prior to transmitting the reporting information, a first scheduling request (SR) to a first TRP of the one or more TRPs and one or more additional SRs to one or more other TRPs of the one or more TRPs. The operations of 1820 may be performed according to the methods described herein. In some examples, aspects of the operations of 1820 may be performed by a SR component as described with reference to FIGS. 8 through 11.

At 1825, the UE may transmit the reporting information to the determined one or more TRPs according to the identified first reporting configuration. The operations of 1825 may be performed according to the methods described herein. In some examples, aspects of the operations of 1825 may be performed by an uplink transmission manager as described with reference to FIGS. 8 through 11.

At 1830, the UE may cancel the first SR responsive to the transmitting the reporting information to the first TRP. The operations of 1830 may be performed according to the methods described herein. In some examples, aspects of the operations of 1830 may be performed by a SR component as described with reference to FIGS. 8 through 11.

At 1835, the UE may maintain the one or more additional SRs of the one or more other TRPs. The operations of 1835 may be performed according to the methods described herein. In some examples, aspects of the operations of 1835 may be performed by a SR component as described with reference to FIGS. 8 through 11.

Figure 19:
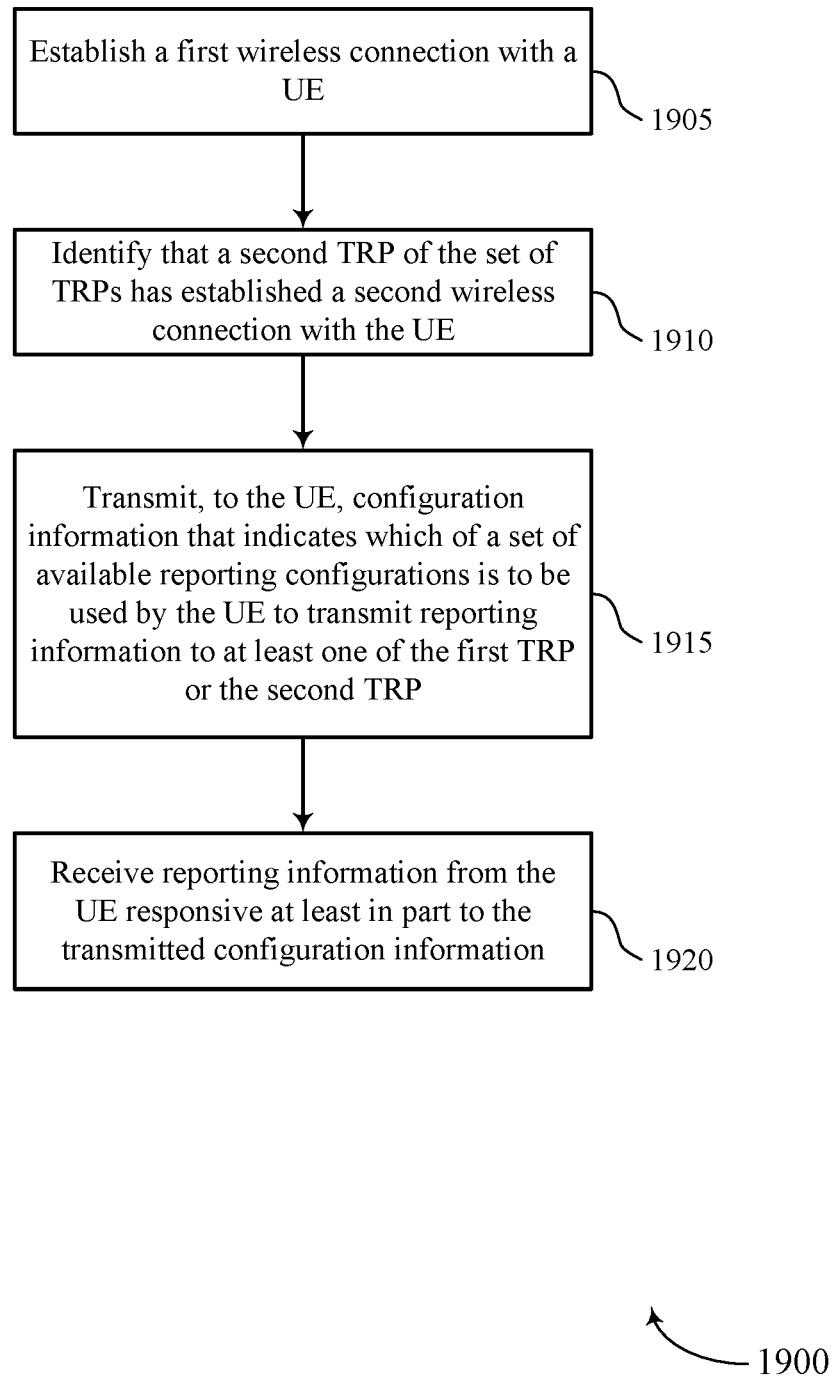

FIG. 19 shows a flowchart illustrating a method 1900 that supports uplink reporting techniques for multi transmission-reception point transmissions in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may establish a first wireless connection with a UE. The operations of 1905 may be performed according to the methods described herein. In some examples, aspects of the operations of 1905 may be performed by a connection establishment manager as described with reference to FIGS. 12 through 15.

At 1910, the base station may identify that a second TRP of the set of TRPs has established a second wireless connection with the UE. The operations of 1910 may be performed according to the methods described herein. In some examples, aspects of the operations of 1910 may be performed by a connection establishment manager as described with reference to FIGS. 12 through 15.

At 1915, the base station may transmit, to the UE, configuration information that indicates which of a set of available reporting configurations is to be used by the UE to transmit reporting information to at least one of the first TRP or the second TRP. The operations of 1915 may be performed according to the methods described herein. In some examples, aspects of the operations of 1915 may be performed by a reporting configuration manager as described with reference to FIGS. 12 through 15.

At 1920, the base station may receive reporting information from the UE responsive at least in part to the transmitted configuration information. The operations of 1920 may be performed according to the methods described herein. In some examples, aspects of the operations of 1920 may be performed by an uplink transmission manager as described with reference to FIGS. 12 through 15.

Figure 20:
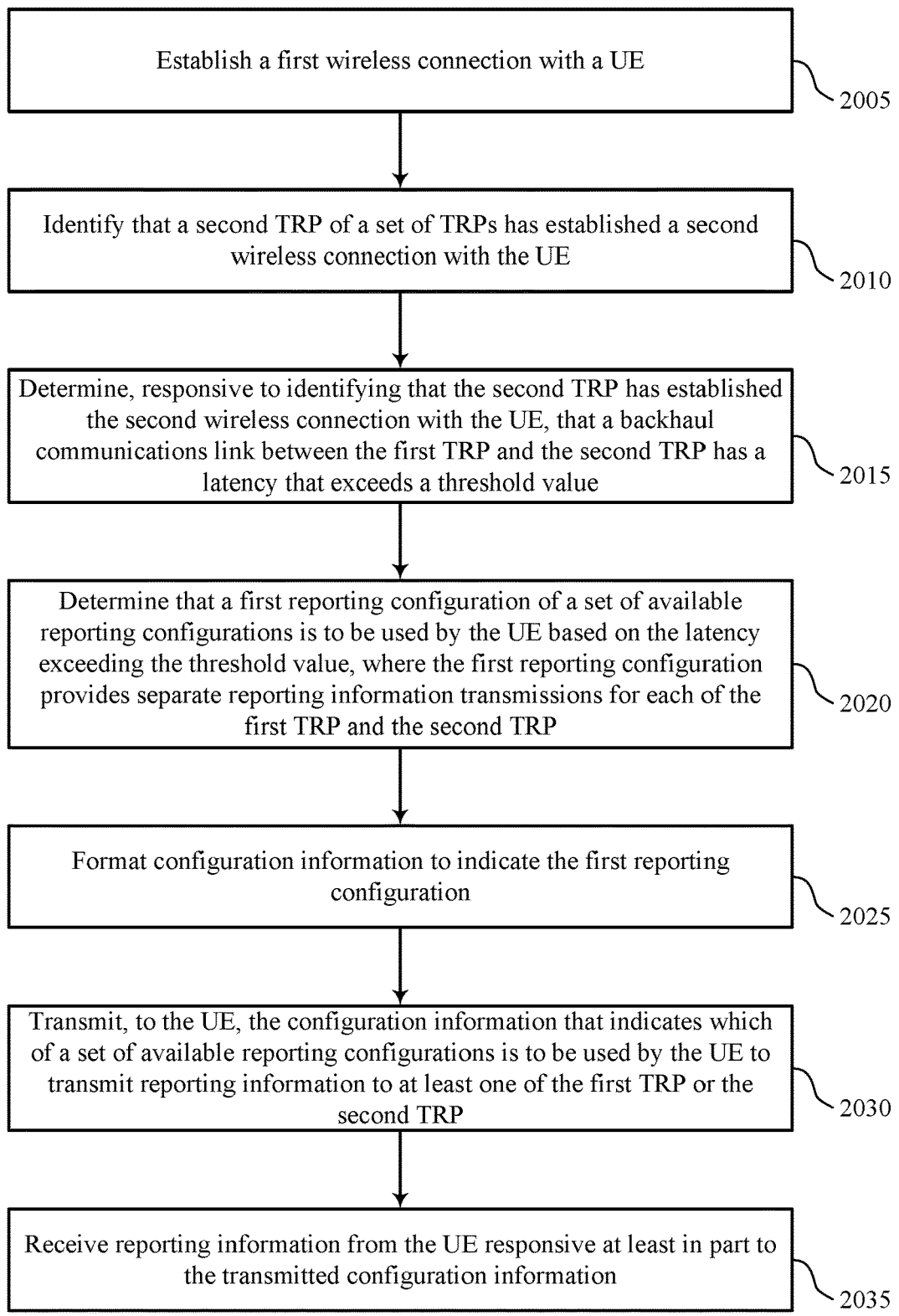

FIG. 20 shows a flowchart illustrating a method 2000 that supports uplink reporting techniques for multi transmission-reception point transmissions in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may establish a first wireless connection with a UE. The operations of 2005 may be performed according to the methods described herein. In some examples, aspects of the operations of 2005 may be performed by a connection establishment manager as described with reference to FIGS. 12 through 15.

At 2010, the base station may identify that a second TRP of a set of TRPs has established a second wireless connection with the UE. The operations of 2010 may be performed according to the methods described herein. In some examples, aspects of the operations of 2010 may be performed by a connection establishment manager as described with reference to FIGS. 12 through 15.

At 2015, the base station may determine, responsive to identifying that the second TRP has established the second wireless connection with the UE, that a backhaul communications link between the first TRP and the second TRP has a latency that exceeds a threshold value. The operations of 2015 may be performed according to the methods described herein. In some examples, aspects of the operations of 2015 may be performed by a backhaul communications manager as described with reference to FIGS. 12 through 15.

At 2020, the base station may determine that a first reporting configuration of the set of available reporting configurations is to be used by the UE based on the latency exceeding the threshold value, where the first reporting configuration provides separate reporting information transmissions for each of the first TRP and the second TRP. The operations of 2020 may be performed according to the methods described herein. In some examples, aspects of the operations of 2020 may be performed by a reporting configuration manager as described with reference to FIGS. 12 through 15.

At 2025, the base station may format the configuration information to indicate the first reporting configuration. The operations of 2025 may be performed according to the methods described herein. In some examples, aspects of the operations of 2025 may be performed by a reporting configuration manager as described with reference to FIGS. 12 through 15.

At 2030, the base station may transmit, to the UE, configuration information that indicates which of a set of available reporting configurations is to be used by the UE to transmit reporting information to at least one of the first TRP or the second TRP. The operations of 2030 may be performed according to the methods described herein. In some examples, aspects of the operations of 2030 may be performed by a reporting configuration manager as described with reference to FIGS. 12 through 15.

At 2035, the base station may receive reporting information from the UE responsive at least in part to the transmitted configuration information. The operations of 2035 may be performed according to the methods described herein. In some examples, aspects of the operations of 2035 may be performed by an uplink transmission manager as described with reference to FIGS. 12 through 15.

Figure 21:
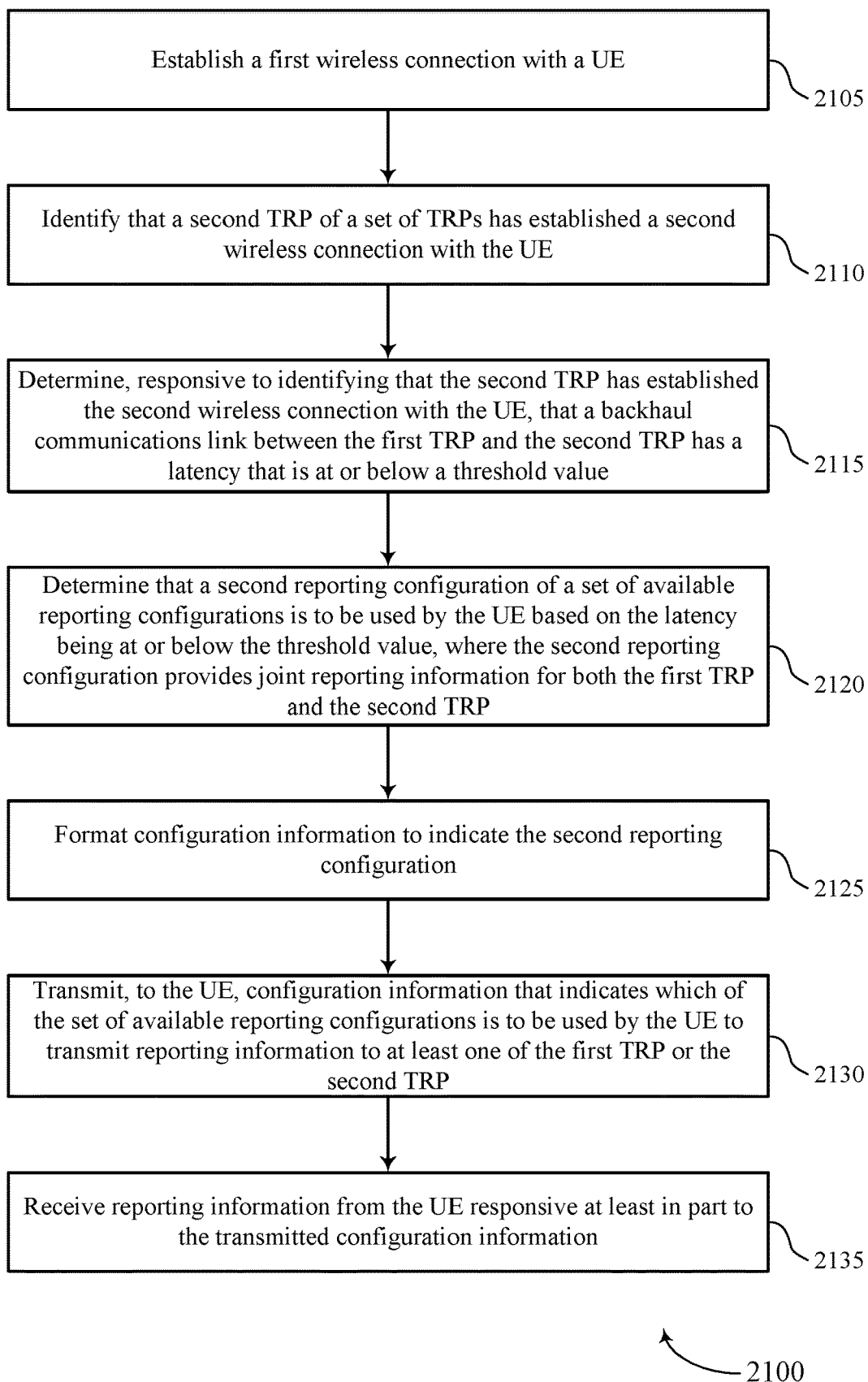

FIG. 21 shows a flowchart illustrating a method 2100 that supports uplink reporting techniques for multi transmission-reception point transmissions in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may establish a first wireless connection with a UE. The operations of 2105 may be performed according to the methods described herein. In some examples, aspects of the operations of 2105 may be performed by a connection establishment manager as described with reference to FIGS. 12 through 15.

At 2110, the base station may identify that a second TRP of a set of TRPs has established a second wireless connection with the UE. The operations of 2110 may be performed according to the methods described herein. In some examples, aspects of the operations of 2110 may be performed by a connection establishment manager as described with reference to FIGS. 12 through 15.

At 2115, the base station may determine, responsive to identifying that the second TRP has established the second wireless connection with the UE, that a backhaul communications link between the first TRP and the second TRP has a latency that is at or below a threshold value. The operations of 2115 may be performed according to the methods described herein. In some examples, aspects of the operations of 2115 may be performed by a backhaul communications manager as described with reference to FIGS. 12 through 15.

At 2120, the base station may determine that a second reporting configuration of the set of available reporting configurations is to be used by the UE based on the latency being at or below the threshold value, where the second reporting configuration provides joint reporting information for both the first TRP and the second TRP. The operations of 2120 may be performed according to the methods described herein. In some examples, aspects of the operations of 2120 may be performed by a reporting configuration manager as described with reference to FIGS. 12 through 15.

At 2125, the base station may format the configuration information to indicate the second reporting configuration. The operations of 2125 may be performed according to the methods described herein. In some examples, aspects of the operations of 2125 may be performed by a reporting configuration manager as described with reference to FIGS. 12 through 15.

At 2130, the base station may transmit, to the UE, configuration information that indicates which of a set of available reporting configurations is to be used by the UE to transmit reporting information to at least one of the first TRP or the second TRP. The operations of 2130 may be performed according to the methods described herein. In some examples, aspects of the operations of 2130 may be performed by a reporting configuration manager as described with reference to FIGS. 12 through 15.

At 2135, the base station may receive reporting information from the UE responsive at least in part to the transmitted configuration information. The operations of 2135 may be performed according to the methods described herein. In some examples, aspects of the operations of 2135 may be performed by an uplink transmission manager as described with reference to FIGS. 12 through 15.

Figure 22:
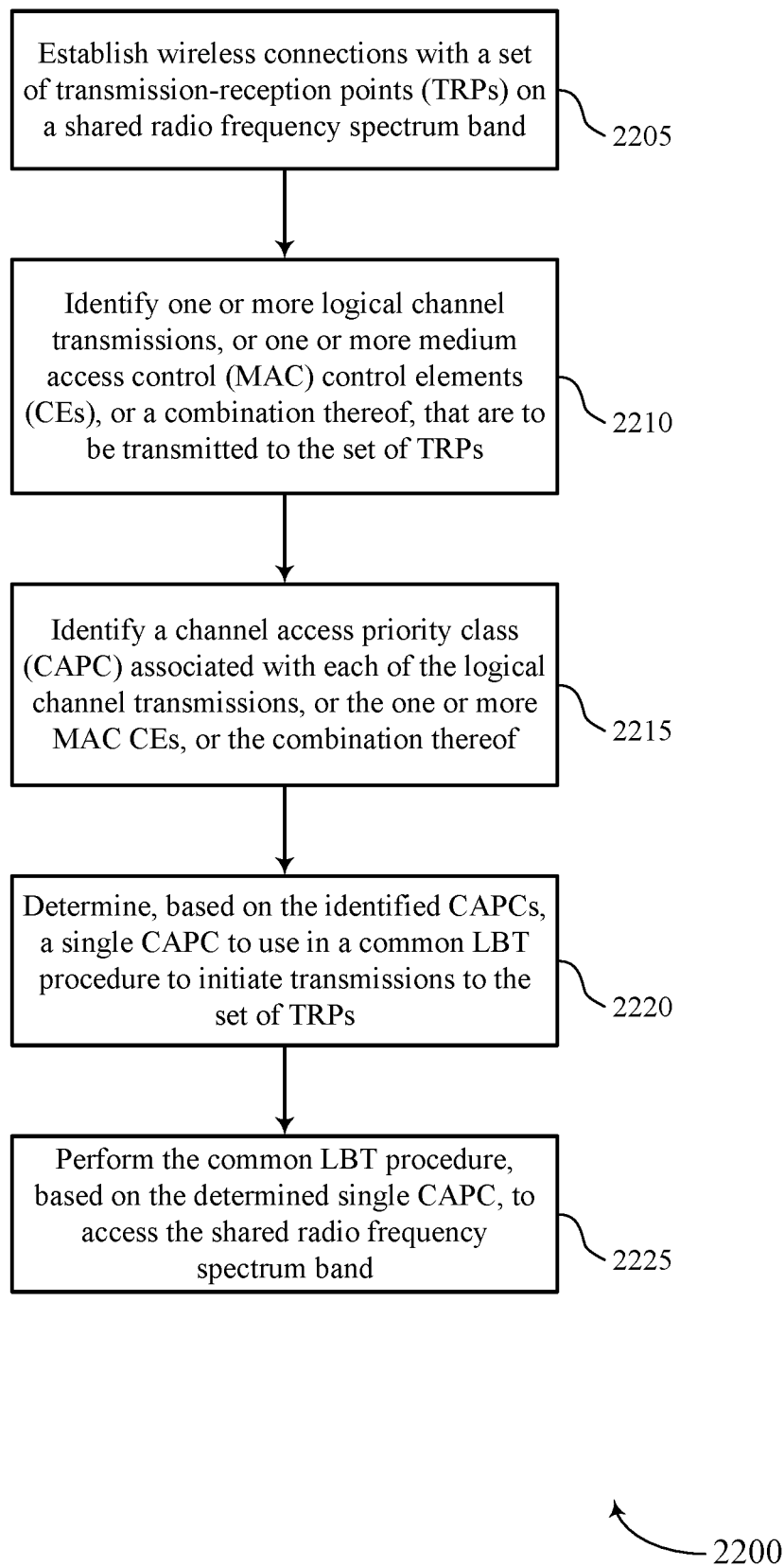

FIG. 22 shows a flowchart illustrating a method 2200 that supports uplink reporting techniques for multi transmission-reception point transmissions in accordance with aspects of the present disclosure. The operations of method 2200 may be implemented by a UE 115 or its components as described herein. For example, the operations of method 2200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2205, the UE may establish wireless connections with a set of transmission-reception points (TRPs) on a shared radio frequency spectrum band. The operations of 2205 may be performed according to the methods described herein. In some examples, aspects of the operations of 2205 may be performed by a connection establishment manager as described with reference to FIGS. 8 through 11.

At 2210, the UE may identify one or more logical channel transmissions, or one or more medium access control (MAC) control elements (CEs), or a combination thereof, that are to be transmitted to the set of TRPs. The operations of 2210 may be performed according to the methods described herein. In some examples, aspects of the operations of 2210 may be performed by an uplink transmission manager as described with reference to FIGS. 8 through 11.

At 2215, the UE may identify a channel access priority class (CAPC) associated with each of the logical channel transmissions, or the one or more MAC CEs, or the combination thereof. The operations of 2215 may be performed according to the methods described herein. In some examples, aspects of the operations of 2215 may be performed by a CAPC component as described with reference to FIGS. 8 through 11.

At 2220, the UE may determine, based on the identified CAPCs, a single CAPC to use in a common LBT procedure to initiate transmissions to the set of TRPs. The operations of 2220 may be performed according to the methods described herein. In some examples, aspects of the operations of 2220 may be performed by an LBT manager as described with reference to FIGS. 8 through 11.

At 2225, the UE may perform the common LBT procedure, based on the determined single CAPC, to access the shared radio frequency spectrum band. The operations of 2225 may be performed according to the methods described herein. In some examples, aspects of the operations of 2225 may be performed by an LBT manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing wireless connections with a plurality of transmission-reception points (TRPs);
    receiving, from a first TRP of the plurality of TRPs, an indication of a plurality of reporting configurations for the UE to use to transmit reporting information for a power headroom report (PHR) associated with the plurality of TRPs, the plurality of reporting configurations comprising a first reporting configuration that indicates that the UE is to provide a joint PHR and a second reporting configuration that indicates that the UE is to provide separate PHRs for each of the plurality of TRPs;
    receiving, via a radio resource control message, configuration information that indicates which one of the plurality of reporting configurations is to be used, the configuration information identifying the first reporting configuration of the plurality of reporting configurations;
    transmitting a scheduling request to one TRP of the plurality of TRPs or multiple TRPs of the plurality of TRPs based at least in part on which one of the first reporting configuration or the second reporting configuration is indicated by the configuration information;
    receiving a first uplink grant for a first uplink transmission in response to the scheduling request; and
    transmitting the reporting information comprising the joint PHR based at least in part on receiving the radio resource control message indicating the first reporting configuration and via resources allocated by the first uplink grant, wherein the joint PHR includes separate power headroom information associated with beamformed uplink transmission to each of the plurality of TRPs, and wherein the separate power headroom information includes at least first power headroom information based at least in part on a second uplink transmission to the first TRP and second power headroom information based at least in part on a third uplink transmission associated with a second TRP of the plurality of TRPs, wherein the second uplink transmission and the third uplink transmission are concurrent uplink transmissions.

2. The method of claim 1, wherein the reporting information includes a single buffer status report (BSR) that is transmitted to the first TRP of the plurality of TRPs for use by two or more TRPs of the plurality of TRPs in scheduling uplink transmissions of the UE.

3. The method of claim 1, further comprising: receiving the first uplink grant from the first TRP of the plurality of TRPs; and determining, based at least in part on the first reporting configuration and the first uplink grant being received from the first TRP, to transmit a BSR to the first TRP.

4. The method of claim 1, wherein the first TRP or the second TRP is selected to receive a buffer status report (BSR) based at least in part on an amount of uplink resources allocated in the first uplink grant associated with the first TRP or a second uplink grant associated with the second TRP, or channel conditions between the UE and the first TRP, or channel conditions between the UE and the second TRP, or a modulation and coding scheme (MCS) of each uplink grant, or a combination thereof.

5. The method of claim 1, wherein the reporting information includes a first buffer status report (BSR) transmitted to the first TRP of the plurality of TRPs, and wherein the method further comprises:
    determining to transmit a second BSR to the second TRP of the plurality of TRPs according to the second reporting configuration of the plurality of reporting configurations; and
    transmitting the second BSR to the second TRP according to the second reporting configuration.

6. The method of claim 5, wherein:
    the plurality of reporting configurations comprise separate BSR configurations provided for each of the first TRP and the second TRP that are to be used by the UE for transmission of a corresponding BSR to a corresponding TRP, and
    the first BSR is transmitted to the first TRP based at least in part on a first trigger from the first reporting configuration, and the second BSR is transmitted to the second TRP based at least in part on a second trigger from the second reporting configuration.

7. The method of claim 5, wherein a buffer status reported in each of the first BSR and the second BSR is a current buffer status of the UE irrespective of uplink data transmissions to one or more other TRPs of the plurality of TRPs.

8. The method of claim 5, further comprising:
    determining a current buffer status of the UE;
    identifying a ratio of data transmitted to the first TRP of the plurality of TRPs relative to a total amount of data transmitted to each of the plurality of TRPs;
    adjusting the current buffer status of the UE based at least in part on the identified ratio to obtain a first adjusted buffer status; and
    reporting the first adjusted buffer status to the first TRP.

9. The method of claim 8, wherein the identifying the ratio comprises:
    estimating the ratio based at least in part on past amounts of data transmitted to the first TRP relative to the total amount of data transmitted to each of the plurality of TRPs.

10. The method of claim 8, wherein the ratio is provided in the first reporting configuration.

11. The method of claim 1, wherein the second uplink transmission is a real transmission and the third uplink transmission is a reference transmission, the reference transmission being a different type of transmission than the real transmission, and wherein the second uplink transmission is associated with a third uplink grant received from the first TRP of the plurality of TRPs.

12. The method of claim 1, wherein the third uplink transmission is a reference transmission based at least in part on failing to receive a second uplink grant for the third uplink transmission.

13. A method for wireless communication at a first transmission-reception point (TRP) of a plurality of TRPs, comprising:
  establishing a first wireless connection with a user equipment (UE);
  identifying that a second TRP of the plurality of TRPs has established a second wireless connection with the UE;
  transmitting, to the UE, an indication of a plurality of reporting configurations to be used by the UE to transmit reporting information for a power headroom report (PHR) associated with at least one of the first TRP or the second TRP, the plurality of reporting configurations comprising a first reporting configuration that indicates that the UE is to provide a joint PHR and a second reporting configuration that indicates that the UE is to provide separate PHRs for each of the plurality of TRPs;
  transmitting, to the UE and via a radio resource control message, configuration information that indicates which one of the plurality of reporting configurations is to be used by the UE, the configuration information identifying the first reporting configuration of the plurality of reporting configurations;
  receiving a scheduling request based at least in part on the first reporting configuration being indicated by the configuration information;
  transmitting, to the UE, a first uplink grant for a first uplink transmission by the UE in response to the scheduling request; and
  receiving reporting information comprising the joint PHR based at least in part on receiving the radio resource control message indicating the first reporting configuration and via resources allocated by the first uplink grant, wherein the joint PHR includes separate power headroom information associated with beamformed uplink transmission to the first TRP and the second TRP, and wherein the separate power headroom information includes at least first power headroom information based at least in part on a second uplink transmission to the first TRP and second power headroom information based at least in part on a third uplink transmission associated with the second TRP of the plurality of TRPs, wherein the second uplink transmission and the third uplink transmission are concurrent uplink transmissions.

14. The method of claim 13, further comprising:
determining, responsive to identifying that the second TRP has established the second wireless connection with the UE, that a backhaul communications link between the first TRP and the second TRP has a latency that exceeds a threshold value;
determining that the second reporting configuration of the plurality of reporting configurations is to be used by the UE based at least in part on the latency exceeding the threshold value, wherein the second reporting configuration provides separate reporting information transmissions for each of the first TRP and the second TRP; and
formatting the configuration information to indicate the second reporting configuration.

15. The method of claim 13, further comprising:
determining, responsive to identifying that the second TRP has established the second wireless connection with the UE, that a backhaul communications link between the first TRP and the second TRP has a latency that is at or below a threshold value;
determining that the first reporting configuration of the plurality of reporting configurations is to be used by the UE based at least in part on the latency being at or below the threshold value, wherein the first reporting configuration provides joint reporting information for both the first TRP and the second TRP; and
formatting the configuration information to indicate the first reporting configuration.

16. The method of claim 13, wherein the reporting information provides an adjusted buffer status from a current buffer status of the UE based at least in part on a ratio of data transmitted to the first TRP relative to a total amount of uplink data transmitted between the UE and the plurality of TRPs.

17. The method of claim 13, wherein the first TRP provides power headroom information from the joint PHR to the second TRP via a backhaul link.

18. The method of claim 13, wherein the third uplink transmission is a reference transmission based at least in part on failing to receive a second uplink grant for the third uplink transmission.

19. An apparatus for wireless communication at a user equipment (UE), comprising:
  one or more processors,
  memory in electronic communication with the one or more processors; and
  instructions stored in the memory and executable by the one or more processors to cause the apparatus to:
    establish wireless connections with a plurality of transmission-reception points (TRPs);
    receive, from a first TRP of the plurality of TRPs, an indication of a plurality of reporting configurations for the UE to use to transmit reporting information for a power headroom report (PHR) associated with the plurality of TRPs, wherein the plurality of reporting configurations comprises a first reporting configuration that indicates that the UE is to provide a joint PHR and a second reporting configuration that indicates that the UE is to provide separate PHRs for each of the plurality of TRPs;
    receive, via a radio resource control message, configuration information that indicates which one of the plurality of reporting configurations is to be used, the configuration information identifying the first reporting configuration of the plurality of reporting configurations;
    transmitting a scheduling request to one TRP of the plurality of TRPs or multiple TRPs of the plurality of TRPs based at least in part on which one of the first reporting configuration or the second reporting configuration is indicated by the configuration information;
    receive a first uplink grant for a first uplink transmission in response to the scheduling request; and
    transmit the reporting information comprising the joint PHR based at least in part on receiving the radio resource control message indicating the first reporting configuration and via resources allocated by the first uplink grant, wherein the joint PHR includes separate power headroom information associated with beamformed uplink transmission to each of the plurality of TRPs, and wherein the separate power headroom information includes at least first power headroom information based at least in part on a second uplink transmission to the first TRP and second power headroom information based at least in part on a third uplink transmission associated with a second TRP of the plurality of TRPs, wherein the second uplink transmission is and the third uplink transmission are concurrent uplink transmissions.

20. The apparatus of claim 19, wherein the reporting information includes a single buffer status report (BSR) that is transmitted to the first TRP of the plurality of TRPs for use by two or more TRPs of the plurality of TRPs in scheduling uplink transmissions of the UE.

21. The apparatus of claim 19, wherein the instructions are further executable by the one or more processors to cause the apparatus to:

transmit, prior to transmitting the reporting information, a first scheduling request (SR) to the first TRP of the plurality of TRPs and one or more additional SRs to one or more other TRPs of the plurality of TRPs;

cancel the first SR responsive to the transmitting the reporting information to the first TRP; and maintain the one or more additional SRs of the one or more other TRPs.

22. The apparatus of claim 19, wherein the second uplink transmission is a real transmission and the third uplink transmission is a reference transmission, the reference transmission being a different type of transmission than the real transmission, and wherein the second uplink transmission is associated with a third uplink grant received from the first TRP of the plurality of TRPs.

23. The apparatus of claim 19, wherein the third uplink transmission is a reference transmission based at least in part on failing to receive a second uplink grant for the third uplink transmission.

\* \* \* \* \*